US012428747B2

(12) United States Patent
McDonald et al.

(10) Patent No.: US 12,428,747 B2
(45) Date of Patent: Sep. 30, 2025

(54) METHOD AND APPARATUS FOR A NOVEL HIGH-PERFORMANCE CONDUCTIVE METAL-BASED MATERIAL

(71) Applicant: Atlas Magnetics Inc., Reno, NV (US)

(72) Inventors: John Othniel McDonald, Reno, NV (US); Zach Zimits, Reno, NV (US)

( * ) Notice: Subject to any disclaimer, the term of this patent is extended or adjusted under 35 U.S.C. 154(b) by 0 days.

(21) Appl. No.: 18/135,660

(22) Filed: Apr. 17, 2023

(65) Prior Publication Data

US 2024/0003041 A1 Jan. 4, 2024

Related U.S. Application Data

(63) Continuation-in-part of application No. 17/900,803, filed on Aug. 31, 2022, now Pat. No. 12,077,877.

(60) Provisional application No. 63/337,078, filed on Apr. 30, 2022, provisional application No. 63/331,761, filed on Apr. 15, 2022.

(51) Int. Cl.

| | |
|---|---|
| ***C25D 17/12*** | (2006.01) |
| ***C23C 28/00*** | (2006.01) |
| ***H01B 1/16*** | (2006.01) |

(52) U.S. Cl.

CPC .............. *C25D 17/12* (2013.01); *C23C 28/32* (2013.01); *C23C 28/345* (2013.01); *C23C 28/42* (2013.01); *C23C 28/44* (2013.01); *H01B 1/16* (2013.01)

(58) Field of Classification Search

None

See application file for complete search history.

(56) References Cited

U.S. PATENT DOCUMENTS

| | | | |
|---|---|---|---|
| 8,065,794 B2 | 11/2011 | En et al. | |
| 9,444,213 B2 | 9/2016 | Singh et al. | |
| 10,532,402 B2 | 1/2020 | Hosek et al. | |
| 12,002,615 B2 | 6/2024 | Hong et al. | |
| 2013/0181331 A1 | 7/2013 | Srinivasan et al. | |
| 2017/0236750 A1* | 8/2017 | Yang | H01L 21/76877 257/211 |
| 2019/0148229 A1* | 5/2019 | Kubik | H01L 23/5226 257/774 |

FOREIGN PATENT DOCUMENTS

| | | |
|---|---|---|
| CN | 104600182 A | 5/2015 |
| CN | 106298634 A * | 1/2017 |
| EP | 1055260 A1 | 11/2000 |
| JP | 2002264731 A | 4/2004 |

OTHER PUBLICATIONS

Liu et al. CN 106298634 A, machine translation (Year: 2017).*

* cited by examiner

*Primary Examiner* — Wojciech Haske

(74) *Attorney, Agent, or Firm* — Prorok Patents

(57) ABSTRACT

A hybrid conductive material comprising at least one conductive material having at least one internal porous insulative layer; and wherein, at least one of the conductive materials fills the voids of the internal porous insulative layer. The hybrid material blends conductive metals and porous insulation layers in a manner so that the resulting material operates as a single layer material with its own unique conductivity and skin depth; and a unique and strong directional impedance. By using a porous insulation layer, metal layers may be bonded together through insulation layers, and this allows rapid low-cost formation of the hybrid material. The hybrid material may be used to form thin wires or traces capable of handling high frequency applications.

21 Claims, 26 Drawing Sheets

METHOD AND APPARATUS FOR A NOVEL HIGH-PERFORMANCE CONDUCTIVE METAL-BASED MATERIAL

BACKGROUND

The field of invention generally and specifically relates to conductive materials.

The resistivity of a wire conductor such as a copper wire rises with frequency due to a well-known phenomenon called the "skin effect." The industry standardizes the skin effect performance of metals with a term called "Skin Depth," which is defined by the distance from the surface to the point in the interior where the current density has dropped by 1/e or ~37%.

At 60 Hz, the skin depth of a copper wire is ~8.4 millimeters; at 60 kHz, the skin depth of copper wire is ~266 μm; and at 6 MHz, the skin depth of copper wire is about 26.6 μm. With traditional materials, to lower impedance at higher frequencies: increasing the conductor's surface area is more effective than continuing to increase the conductor's thickness beyond the skin depth.

However, there are a few classic methods to help mitigate skin effects. These include using wide and thin conductors, which have an increased surface area without any increase in the total volume of the conductor, for example, widening a printed circuit board trace. Other methods to reduce high-frequency impedance include using multi strand twisted Litz wire and coating aluminum or copper wire with silver, where these methods can be combined or used separately. A Litz wire increases the surface area of a wire vs. a solid wire and adding a lower resistance metal on the surface of a wire lowers the resistance as well as increases the skin depth.

Physically skin effect, proximity effect and eddy current are related and happen at the same time. An ideal conductor has infinite conductivity a. In this case, the Maxwell equations show that the internal electric and magnetic fields along with internal current density distributions in the ideal conductors will be zero. Thus, the electric and the magnetic fields along with electric currents will be confined on the ideal conductor surfaces. Any conductor, which does not have infinite conductivity a, is defined as a non-ideal conductor and will have internal electric and magnetic fields distributions along with internal current density distributions. The general solution of the Maxwell's equations show that the internal electric and magnetic fields and current density distributions will be maximum at the non-ideal conductor surfaces, and they will penetrate deep into the interior regions following by an exponential decay fashion approximation where the decay is related to the plane wave skin depth δ given as, $$\delta = \sqrt{\frac{2}{\omega\mu\sigma}} \text{ where } \omega = 2\pi f \quad (1)$$

Where f, ω, μ and σ are frequency, angular frequency, magnetic permeability, and conductivity. In this case the internal electric, magnetic field and current density distributions are generally very complex functions which depend on the conductor geometry and frequency where analytical solutions do not exist. Analytical solutions can only be obtained for very simple structures and with sometimes very difficult to satisfy assumptions in practice. Physically skin effect, proximity effect and eddy current are all very related effects and happen at the same time but are very useful concepts to understand the overall phenomena.

As can be seen in equation (1) skin depth is proportional to the square root to the inverse of frequency and conductivity. In other words, the higher the frequency of the AC current the shorter the skin depth and the lower the resistivity of the conductive material the deeper the skin depth. Copper, being a very low resistivity conductor has one of the deepest skin depths only being surpassed by silver.

Attempts to reduce power loss in conductive materials, including wires or traces, also use multilayer structures. For example, wide and thin traces placed in parallel, separated by an insulator but connected at the beginning and end of the trace, these structures may significantly reduce impedance by increasing the total surface area where the total impedance is calculated as the parallel combination of the layers according to Ohm's law, assuming the insulation is thick enough to minimize electrical interaction between the layers.

Multilayer conductors manufactured on a base of epoxy or plastic make use of low-cost materials but are still costly to manufacture. The cost of making a conductor in this style comes from the increased number of manufacturing steps, which roughly comprise: electroless copper prep, electroless copper plating, wash, dry, dry film patterning, copper electroplating, wash, dry, dry film removal, etch, wash, insulator placement for a total of 12 steps in the process—and then repeating the 12-step process until achieving the required number of layers. This method of layering often suffers from costly excessive waste material while consuming significant process time. In addition, excessive thickness as well as delamination issues, which can further increase the processing steps, reduce reliability, or limit useful applications.

Integrated multilayer conductors manufactured on the surface of silicon are costly or not available because the silicon wafer itself is costly or copper deposition thicker than the skin deposit is not supported or not possible.

The following WIPO Patent Application is incorporated by reference in full:

WO 2015/107059 A1; Plasma Coating Method for Depositing a Functional Layer, and Depositing Device; invented by Bisges Michael, Eckardt Norbert, and Tiller Christian

REFERENCES

1. "Engineering Electromagnetic Fields and Waves," Carl T. A. Johnk, John Willey & Sons, Copyright 1975, ISBN 0-471-44289-5.
2. "Elements of Electromagnetics," Matthew N. O. Sadiku, Oxford University Press, Copyright 2001 Third Edition, 2001, ISBN 0-19-513477-X.
3. "Power Electronics," N. Mohan, Tore M. Undeland and William P. Robbins, Third Edition, Copyright 2003, John Willey and Sons, Inc., ISBN 978-0-471-22693-2.
4. Eddy Current, Skin and Proximity Effects, https://www-.dataforth.com/eddy-current-skin-proximity-effects
5. Texas Instruments, Magnetic Design 3, slup125. "Magnetics Design 3—Windings"
6. Guo, Xuan, Li Ran, and Peter Tavner. "Lessening gap loss concentration problems in nanocrystalline cores by alloy gap replacement." *The Journal of Engineering* 2022.4 (2022): 411-421.

SUMMARY OF THE INVENTION

The preferred embodiment presents a hybrid conductive material. The material is referred to as a hybrid because it blends conductive metals and novel porous insulation layers in a manner so that the resulting material operates as a single layer material with its own unique skin effect and a unique and strong directional impedance. For example, when the conductive metal is copper the hybrid material is capable of handling high-frequency currents with a much greater skin depth compared to bulk copper resulting in a much lower impedance for a given track or trace length for the same conductor cross-section. In practice, the hybrid material delivers a much higher quality factor (Q) due to a substantial reduction in impedance over frequency as compared to bulk copper with the same conductor cross-section. A copper-based hybrid material trace may be significantly reduced in width as compared to a bulk copper trace with similar impedance over frequency.

The beneficial properties of the hybrid material are granted through the use of porous insulation layers. A porous insulation layer of the present invention allows for direct plating through the insulation layer so, for example, the underlying metallic layer may act as an electrode in an electroplating process. However, the insulative layer still retains an insulative effect that is strong enough to reduce power losses created by high-frequency current enough to allow for small, efficient, and high-frequency capable wires.

The hybrid material is formed by, preparing a layer of conductive material; forming a porous insulation layer on a surface of the layer of conductive material; and depositing an additional layer of conductive material onto a surface of the insulation layer in a manner connecting the additional layer of conductive material to the prepared conductive material through the porous insulative layer.

However, a hybrid material can be created without the deposition of an additional layer of conductive material. This will create a conductive material having a porous insulative layer on an external surface of the conductive material and the conductive material will be capable of serving as an electrode in a plating bath.

To build up the hybrid material, perform and repeat at least once the steps of depositing an additional layer of porous insulation layer onto a surface of the additional layer of conductive material and depositing at least one further layer of conductive material onto the additional layer of porous insulation layer until or before the earliest of 60 wire layers or 50 μm total conductive material thickness is reached. However, it is not necessary to plate a single metal layer and then plate a porous insulation layer. Instead, one may plate multiple conductive layers before depositing a porous insulation layer. Therefore, a hybrid conductive material comprising, at least one conductive material having at least one internal porous insulative layer; and wherein, at least one of the conductive materials filling through the voids of the internal porous insulative layer, is achieved.

The hybrid conductive material has a primary conductive material composition incorporating copper, silver, gold, or an alloy thereof and may further have a composition incorporating a wire additive. Common additives include chromium, magnesium, aluminum, phosphorus, carbon, or sulfur—a wire additive is a material that is added to a wire to improve or add to a property of the wire. Additives can be mixed into the wire layers or have their own layers in the material.

The hybrid material may have multiple layers of metal between each porous insulative layer. The material which is used to fill the voids of the porous insulation layer may have its own layer which is equal to and superimposed with the porous insulation layer. The material filling the voids of the porous insulative layer may be a wire additive.

To deposit the conductive material layers, an electroplating method may be used. The electroplating method is a direct current plating, pulse plating, reverse pulse plating technique or a combination of these techniques.

There is no need for any surface preparation of the insulative material or other intermediary steps between the deposition of the conductive material and the porous insulation; however, washing and drying the material layer before plating the additional porous insulation layers can be beneficial.

To deposit the porous insulation layer a printing method, a AP-PECVD deposition, or a combustion chemical vapor deposition process may be used. To form a porous insulation layer after depositing a non-porous insulation layer a process such as grinding or etching may be used to thin the layer until it becomes porous.

Both AP-PECVD deposition, CCVD, and in some cases printing rely on chemical precursors to produce the insulation material for the porous insulation layer. When the porous insulation layer is a porous silicon dioxide insulation layer, the chemical precursor will be a silicon dioxide precursor. Polysiloxane is a class of chemicals that can be as a precursor to silicon dioxide.

When depositing a porous insulation layer by AP-PECVD or CCVD the patterning elements, for example, photoresist or dry film, may be coated by flame or AP-PECVD. The photoresist or dry film may be passed through the deposition flame or plasma at a rate exceeding 1 meter per minute and may be passed through the deposition flame or plasma at a distance closer than 20 cm from the source. In at least one exemplary embodiment, after all deposition steps are completed the patterning elements may be removed, for example, by standard chemical stripping.

In at least one exemplary embodiment, the porous insulative layer is deposited with a deposition method that is designed to thin the deposited material to such an extent as to introduce the necessary voids necessary to immediately begin electroplating following the insulative deposition. These are the mechanical or chemical etching methods of forming a permeable insulative layer. An insulative layer may be placed, and then, for example, ground down by a grinding process until the insulation layer is so thin that voids begin to appear. In some embodiments, only certain portions of the insulation layer will be thinned or turned into voids. These post-insulation deposition processes may be designed to introduce a regular or random pattern of voids in the porous insulation layer.

By requiring only a single patterning step, an ability achieved by allowing the patterning element to pass under or through plasma or CCVD flame and plating through the porous insulative layer, the hybrid conductive material will have side walls that does not have an offset portion as the patterning elements, for example, dry film or photo resist need not be replaced. Therefore in at least one embodiment, the photoresist or dry film is not replaced or removed during the plating process, and the insulation deposition occurs for up to 60 electroplated conductive layers. When this occurs, the insulative material may deposit on the patterning elements as well as the conductive layers.

In at least one exemplary embodiment, the insulation layer has a coverage percentage between 90 and 99.99% and has a thickness of between 10 nm and 5 μm. Although the insulation layer thickness in other embodiments may be under 4 μm, for example, when an AP-PECVD deposition process is used. In other embodiments, the layer thickness may vary and may be any thickness or range of thicknesses.

In at least one exemplary embodiment, the porosity of the porous insulative layer is defined by a series of voids in the insulation layer, with each of the voids individually smaller than 40 μm in diameter. In other embodiments, the voids may vary in size, and larger voids may be created. The larger voids may even occur due to the random nature of some deposition processes, including AP-PECVD or CCVD. The pattern of voids may be regular or random.

The hybrid conductive material may be operably connected to a base. This connection is achieved by depositing the material on the base. In at least one exemplary embodiment, the base may be a semiconductor wafer, silicon-on-insulator wafer, semiconductor substrate, panel, sheet, roll, or carrier up to 50 μm thick. In at least one embodiment, the base has a series of ridges of squared, circular, or triangular shapes with a localized roughness of less than 5 μm. The roughness increases the surface area of the upper surface of the hybrid material. More than one hybrid material may be plated on a single base if the base is large enough.

Depositing the hybrid material in the shape of a conductive wire with enough insulative layers will configure the hybrid material to serve as a hybrid wire. In theory, at least one porous insulative layer is enough for the hybrid material to serve as wire; the number of insulative layers may be optimized according to the intended use of the wire.

When the hybrid material is configured as a hybrid wire it may be connected to other components or package layers which are above or below it. To facilitate the vertical connection of the wire in semiconductor package it may be useful to provide a connector which allows current to curve and thus fit the optimum current path through the hybrid material comprising the wire. The connectors can be made by patterning at least one pillar which is electrically connected to at least one side of the hybrid material. Multiple connectors may be operably attached to a single hybrid material or hybrid wire so that the connections of the hybrid wire to the system it resides in are optimized. These connectors may be added during the plating process by adding an additional patterning and plating step. By plating the pillars and the connectors with separate patterns the straight side walls of the hybrid material are persevered.

BRIEF SUMMARY OF THE FIGURES

FIG. 19*d* shows an abstraction of the same peaks and valleys.

DETAILED DESCRIPTION

The present invention relates to the field of thin film conductive material and material science. Without limiting the indication, the present invention is directed toward novel conductive materials and the methods of producing such conductive materials.

The methods of the present invention present methods of manufacture that result in a high-frequency, high-performance conductive material for use as, but not limited to, a replacement for conductive materials in circuits. By creating, for example, a new copper-based hybrid material to handle skin effect loss, the size and shape of the conductor may be substantially reduced for the same performance as a bulk copper would as the high-frequency performance of the material will be substantially better than bulk copper per area unit as measured in impedance or Q at higher frequencies (from 200 MHz to 30 GHz). The elegant conductive material of the present invention can be adapted to a variety of sizes and shapes to keep up with the industry as it advances into smaller and thinner components and products—while enabling those components and products to handle higher frequencies than they otherwise would be able to. The performance advancements are also accompanied by a significant reduction in process material waste, process time, and manufacturing energy consumption and the associated cost benefits.

The present invention is to be generated in a low-cost manner by creating a "hybrid conductive material" of periodically layered conductive metals and novel porous insulation that is mechanically, chemically, electrically, and thermally compatible with traditional semiconductor packaging, semiconductor wafers, printed circuit boards, metallic and polymer based tapes and foils, and other materials including but not limited to dry film and photoresist used in the manufacturing process of the same. The present invention thus greatly expands the availability of low-cost, high-performance, high frequency conductive materials.

Figure 1:
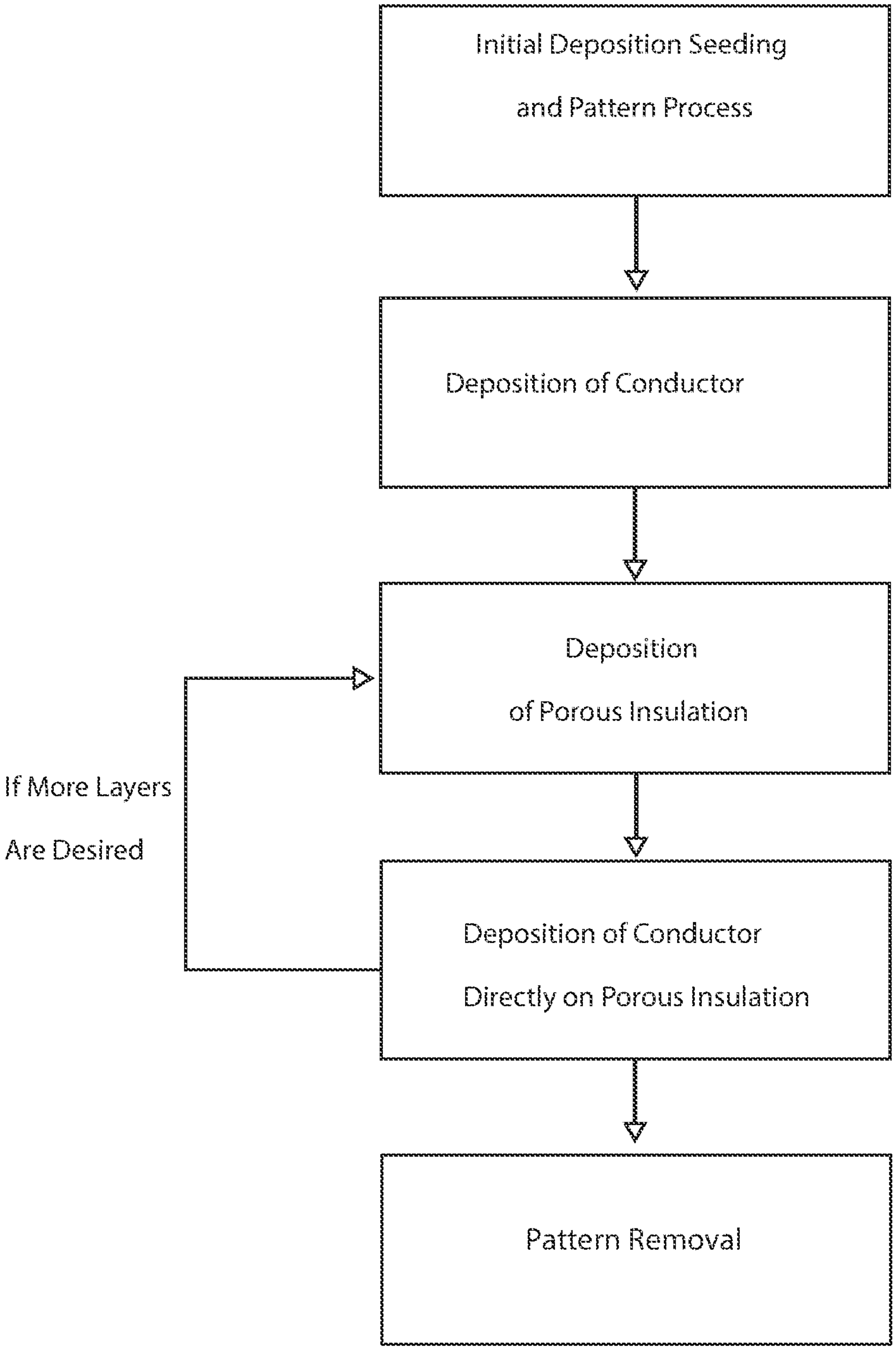
FIG. 1 is a flowchart showing an exemplary method of the present invention.
Figure 2:
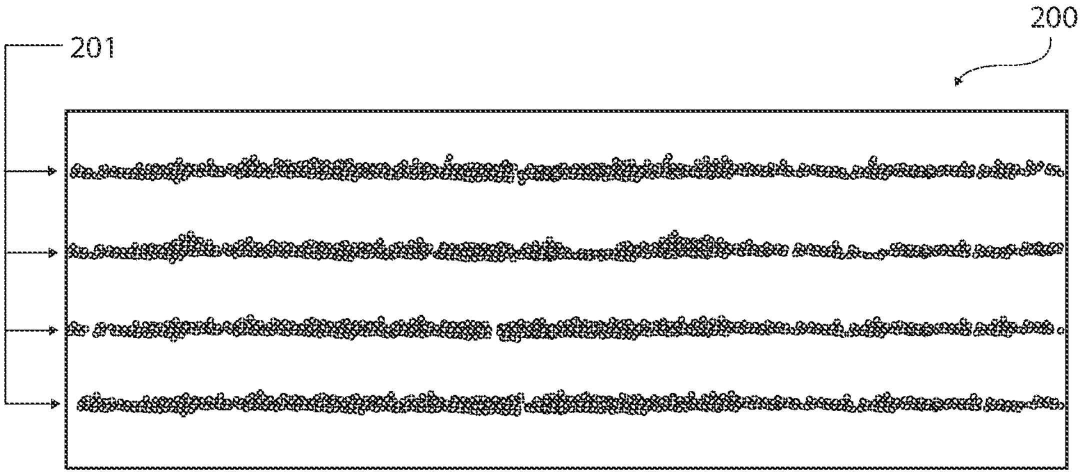
FIG. 2 is a perspective view of an exemplary embodiment of the present invention.

At least one exemplary embodiment of the present invention is a copper and silicon dioxide-based hybrid material. As shown in FIG. 1, the material is created utilizing means of deposition wherein copper is deposited, and a porous insulation layer is deposited. As shown in FIG. 2, these means of deposition are used to produce a layered material with porous insulation layers 201 are layered within the conductor 200. So that, in essence, the copper has internalized a porous silicon dioxide layer. A porous layer is one that does not fully separate one copper layer from another but allows for the copper layers to directly connect to each other through the silicon dioxide layers.

The new methods create a new "hybrid conductive material" with unique properties which will be referred to as "hybrid conductive material." Traditional conductive materials which are able to be electroplated, such as Cu, Ag, Al, Ag, and their alloys, not including insulation materials, will be referred to as "conductive materials." Electrical insulative materials will be referred to as "insulative materials." The hybrid conductive material combines conductive materials and insulative materials in a manner that allows for a new single material to be made which has directional impedance. Hybrid material used as wiring will be referred to as "hybrid wiring" as an example of an application-specific term.

The porosity, pinholes, or intentionally created gaps within the insulation layers of the hybrid material are referred to as voids and give the porous insulation layer its porousness. The voids allow conductive materials to interconnect through the insulation layers during the electroplating deposition of the subsequent conductive material layer and thus form a single mass of hybrid conductive material. For example, in electroplating, the initial layer of conductive material can still act as one of the two electrode plating electrodes, even though an insulative layer of the present invention—because the insulation layer is porous.

Figure 3A:
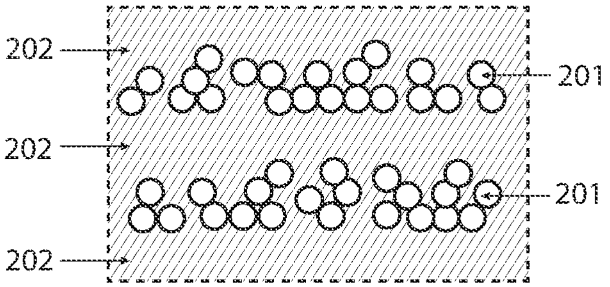
FIG. 3*a* and FIG. 3*b* show a sectional view of an exemplary embodiment of the present invention.
Figure 3B:
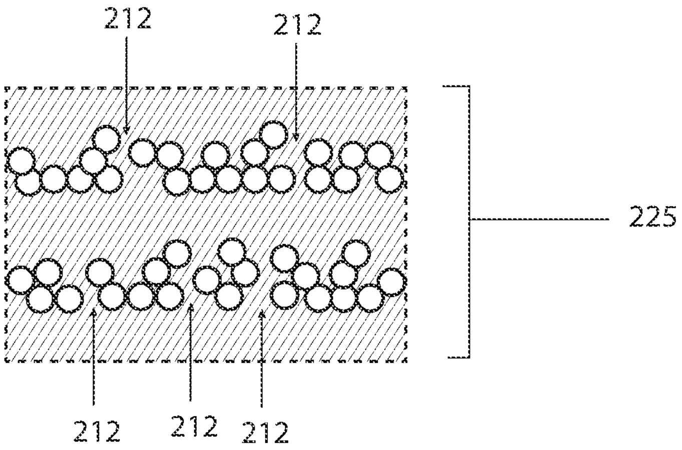

Although any subsequent layer deposited onto a porous insulation layer will combine with the recipient metal layer (recipient) to form a new, essentially single layer of material that has a porous insulation layer within it, it can be useful in describing the material to define the layers individually. FIG. 3*a* shows conductive material layers 202 and porous insulation layers 201; these layers have been individually defined to enable us to speak of placing a layer down or forming a layer of material. However, FIG. 3*b* shows that a recipient 223 will form what is a single block of material 225 with porous layers of insulation 201 by connecting through the through-holes (voids) 212 of porous layers 201. The layers 201 may vary in thickness or composition as may layers 202. But in all cases the thickness of the layers is manufactured to be less than or equal to the skin depth of the lowest resistivity conductive material incorporated in the hybrid material.

As in general the metals and the insulators of the preferred embodiments are widely available, the material cost of the present invention is low. As direct electroplating requires only a few steps, the conductive material of the invention is cheap and quick to form—in exemplary embodiments, the cost is far lower than multi-layer conductors where insulation layer impedance prevents the next layer from being directly electroplated. The cost is also far less compared to traditional closed chamber plasma vapor deposition "PVD"

or "CVD" processes commonly used in the semiconductor industry, which is far slower, more expensive, temperature incompatible with printed circuit boards and requires each layer to have a new photoresist pattern.

As noted above, the insulation layer of the present invention allows the conductive material to fill the voids in the insulation layer so that each layer of conductive material may physically and electrically connect through the insulation layer. Thus, the insulation layer is a porous boundary layer within the wire, and this porosity is by intention and of a sufficient even density. The ability for the conductive metal layer to connect electrically allows for the conductive material layer to function as an electrode in a plating process. However, to most trained in the art, the intentional electrical connection of metal layers in a wire would immediately seem to defeat the purpose of requiring insulation layers in the first place and indeed it does limit the insulating performance somewhat between two layers, but the cost reduction of placing each layer is high, thus economically allowing for far more layers and thinner layers. This results in higher performance for the entire hybrid conductive material for key specifications and at least sufficient performance for all other parameters.

The downsides of the thin, porous insulation layer are mitigated by presenting a series of porous insulation layers within the novel conductive material as each new porous layer better enables the conductive material to increase its resistance to eddy currents. The upsides of the thin, porous insulation layer are that it is a thin insulation layer that is simple to place, and multiple insulation layers can be placed economically closely together. The layer count of a hybrid material is limited by the eventual build of resistance in the hybrid material so that it can no longer serve as an electrode.

The porous insulation layer can be economically placed hundreds of times within the conductive material before the conductive material reaches a thickness where the material impedance is too high to economically allow further plating. However, in the exemplary embodiments, this thickness limitation approaches 50 μm which is far thicker than the economic or manufacturing limitations of existing layering technologies.

Because the conductor layers interact with each other, the material does not act as a classic multilayered material with a new perfect insulator separating the layers; instead, the material presents its own unique characteristics, such as a new skin depth. The deposition processes allow the conductive material to be quick at usually less than 12 seconds per meter of surface area and low-cost to produce with far less waste—enabling practicality for manufacturing at scale, even in cost-sensitive applications.

In at least one embodiment, shown in FIG. 2, the insulation layers 101 have a thickness of between 50 to 70 nanometers, but anywhere between 10 to 250 nanometers has been found to be economically useful. The thickness, spacing, and coverage of the insulation layers can dictate the electrical behavior of the new material which can there serve a role as a conductive material, for example, serving as a wire or trace.

Traces in PCB's connect the components like integrated circuits, resistors, capacitors, and inductors and must be low resistivity structures. If the traces are signal lines or grounds or power of the transmission lines, they also must be low resistivity structures.

Typical PCB trace thickness is in the order of a 17.5 micron or ½ oz copper and is produced by electroplating or copper foil lamination. The porous insulation players of the hybrid material are not true laminations, instead they are better referred to as depositions. For example, in at least one exemplary embodiment, a thin layer of copper of 0.1 to 2 microns thick is electroplated usually selected to be 3 to 5× thinner than the skin depth of copper at the target frequency, and on top of it a porous insulator is deposited of 30 to 200 nm. Because the underlying copper layer is not entirely insulated, the copper layer acts like an electrode allowing the electroplating of the next thin copper layer and the process is repeated many times until desired trace thickness is reached.

This process will improve the general properties of a component which utilizes the hybrid wires of the present invention. Taking an inductor, for example, we know that the quality factor 'Q' is related to the angular frequency (w) through the equation $$Q(\omega) = \omega\frac{\text{maximum energy stored}}{\text{power loss}}.$$

We also know that for an inductor, the impedance (Z) is related to resistance (R), inductance (L), imaginary unit (j), and linear frequency (w) such that Z=R+jωL. Since impedance then appears as a vector sum of the resistance and the reactance of the inductor, it is directly related to both the inductor's energy storage and power loss. Therefore, by lowering the impedance of the material of the present invention, the Q of the component it has been integrated into goes up. A high Q is valuable for oscillators, PLLs, and RF filters, among others.

The overall increase of vertical resistivity in the hybrid material based on copper is a ratio of [[copper thickness ($T_c$) multiplied by 1.68 μohm·cm]+[the thickness of $SiO_2$ infused with copper ($T_{CiSO}$) multiplied by 1.68 μohm·cm×20 for a 95% area coverage]]/[thickness of copper ($T_c$)+thickness of $SiO_2$ infused with copper ($T_{CiSO}$)] as stated in the formula below for a conductive material with 95% coverage of the copper layer by the $SiO_2$ layer.

$$\frac{T_c * 1.68(\mu\Omega.\text{cm}) + T_{CiSO} * 1.68(\mu\Omega.\text{cm}) * 20}{T_c + T_{CiSO}}$$

In at least one exemplary embodiment of the present invention the porous insulation layer is composed of $SiO_2$. Silicon Dioxide is a very good insulator, such that the parallel combination of the impedance of the copper in the pores vs. $SiO_2$, as measured vertically, is practically the impedance of the copper in the pores. So at 95% coverage, this yields an increase of impedance in the thin layer of roughly 20× higher or 1/(1-95%) as compared to no $SiO_2$ being present.

Figure 4:
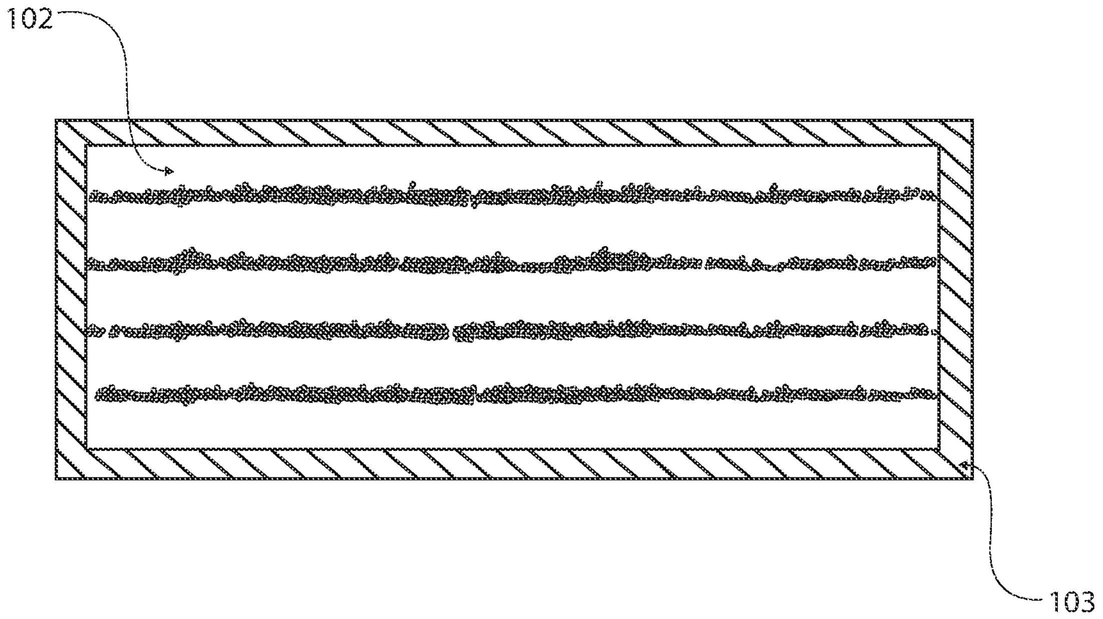
FIG. 4 is a perspective view of an exemplary embodiment of the present invention where the hybrid material has a lamination.

Given that the conductor material of the present invention does not need to be insulated in the same manner as Litz wires and other multilayer embodiments, the hybrid conductor material 200 can, therefore, as shown in FIG. 4, may have an layer 103 or layering of other materials including metals, metal alloys, plastics, ceramics, or other materials to further reduce the size of complex components to which it may be integrated. One useful lamination or layering may be to layer the hybrid copper conductor with another conductive material for use in improving the conductive properties of an inductor component.

To form a hybrid material of the present invention, in at least one exemplary embodiment, a metallic layer is first prepared by electroplating, the surface is washed and dried, then a porous insulation layer is formed by CCVD or AP-PECVD, next an additional metal layer is deposited. In the exemplary embodiment, the insulation layer may be composed of insulative particles stuck together in such a fashion as to leave a small percentage of voids. In another embodiment, the insulation layer may also be a very thin plasma-enhanced deposited material such that pinholes are randomly distributed across the surface of the insulative layer. In yet another embodiment, the insulation layer may be deposited void free but have voids that are generated by additive, subtractive, or mechanical processes. Additive processes include printing processes, subtractive processes include drilling or etching, and mechanical processes include crushing or thinning. In all cases, voids in the insulation layer are generated, which may be arranged randomly, systematically, or at least semi-randomly. A semi-random process is a random process that is directed on some level, for example, directing a random process to some limited portion of the insulative layer or setting a minimum distance for individual voids.

In at least one exemplary embodiment, the conductive material is prepared or deposited in layers that in total are less than 50 μm thick onto a base which may be but is not limited to, a semiconductor wafers, semiconductor packaging epoxy, metallic films, polymer films, silicon-on-insulator wafers, semiconductor substrates, panels, sheets, rolls, carriers or printed circuit board materials. In at least one embodiment, the base is designed to increase the total surface area of the final conductive layer for the purpose of increasing the total volume of conductive material by having regular or irregular ridges of squares or rectangles, semi-circular or semi-elliptical shapes, or triangular shapes of a 1.5 to 5× aspect ratio. In either case, the flat or shaped base presents a localized roughness of less than 5 μm with the ideal being 0 μm. As layers are deposited onto the base, the layer surfaces will roughly reflect the underlying surface of the base.

The porous insulation layer is an insulation layer that is intended to be physically and electrically porous enough such that a metal layer beneath the insulation layer can be used as an electrode in an electroplating bath or as a base for a subsequent metal layer in at least one other deposition process. In at least exemplary embodiment, the through-portion of the porous insulation layer will leave between ninety-five and ninety-eight percent of the underlying layer surface still covered. However, in other embodiments, coverage percentages between eighty percent and very near one hundred percent are economically viable. The insulation layer may be deposited in one or more depositions to achieve the desired coverage percentage as determined through empirical characterization of the process using industry-standard tools or indirectly by measuring the frequency response of the resultant conductive material.

To achieve a porous insulation layer, several techniques may be used. In one exemplary embodiment, the porous insulation layer is produced by combustion chemical vapor deposition "CCVD" using a silicon dioxide precursor chemical injected into a flame. In at least one exemplary embodiment, the porous insulation layer is produced by open air atmospheric pressure plasma enhanced chemical vapor deposition "AP-PECVD". In yet another exemplary embodiment, the porous insulation layer is produced by a print process. However, there are many suboptimal ways to provide a porous layer, such as intentionally crushing, pattern etching, or exposing to radiation the insulation or thinning, grinding, or polishing a deposited layer to achieve a sufficient number of voids to allow for continued electroplating. A suboptimal porous insulation layer can mean that a process only takes advantage of a portion of the novel features described in this invention but may still be economically viable.

In Combustion Chemical Vapor Deposition "CCVD," or open-air plasma-enhanced vapor deposition, and printing methods, once the porous insulation layer is placed, without any intermediary steps, the conductive material and the most recent porous insulation layer may be placed directly into an electroplating bath, and the subsequent conductive layer conductive material electroplated. The conductive material being plated will fill the voids of the porous insulation layer and form a new conductive layer that is connected to the previous conductive layer so that they effectively become one. The voids in the insulation layer, no matter their deposition method, are ideally of a size smaller than the thickness of an individual layer which in the preferred embodiment are 1.5 μm or less but in all cases have a plurality of void sizes of 25 μm. Due to the random and statistical nature of the size and location of the voids in many of the deposition methods, there will be cases where statistically a larger-than-desired void is created. However, finer layering and careful characterization of the deposition process with sufficient statistical process tolerance can mitigate any yield issues. This coupled with a final frequency and load tests result in a high quality, high performance conductive material suitable for use in electronic components.

Figure 5:
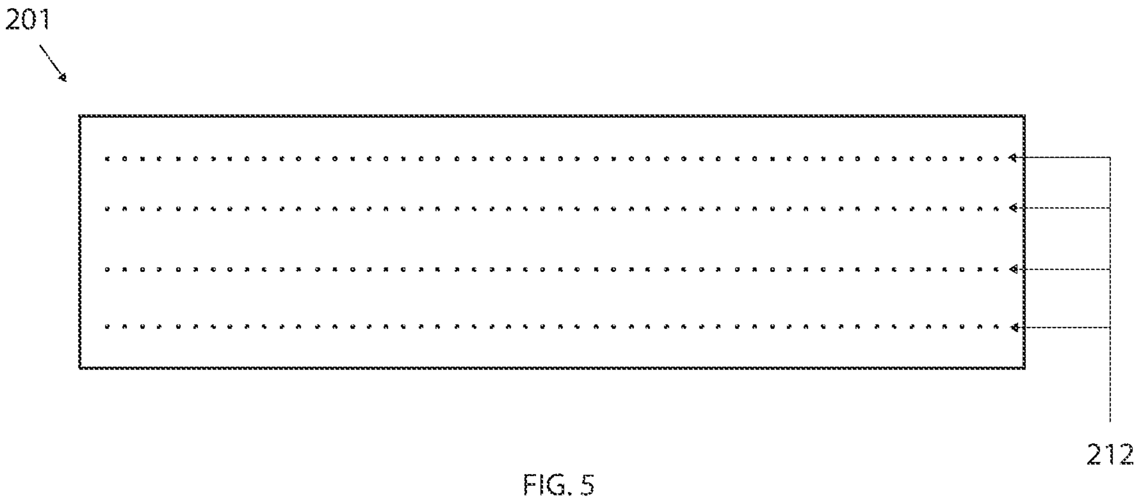
FIG. 5 is a sectional view of an exemplary embodiment of the present invention showing a porous insulation layer that has been printed with a uniform distribution of voids.
Figure 6:
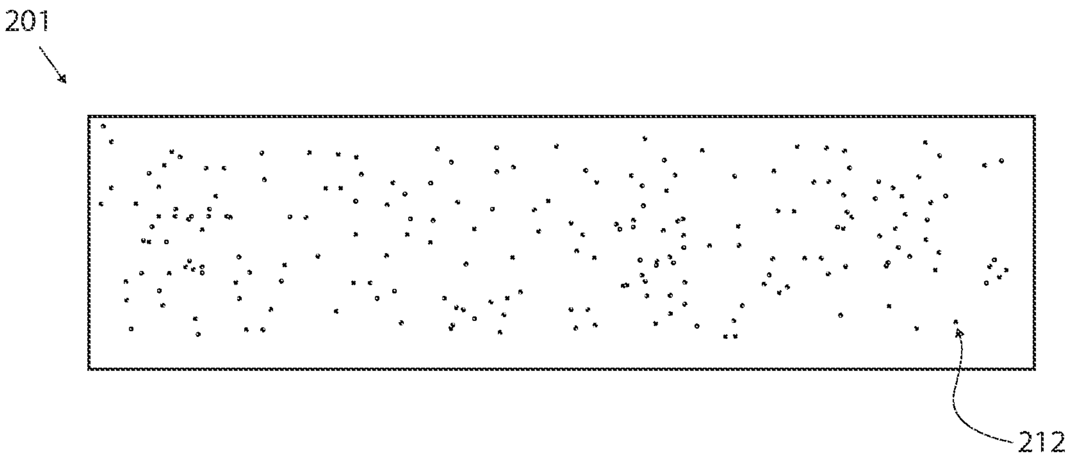
FIG. 6 is a sectional view of an exemplary embodiment of the present invention showing a porous insulation layer that has been printed with a random distribution of voids.

In the case of printed insulation, voids 212 may be placed as desired, for example as shown in FIG. 5 where voids 212 are uniformly spaced within insulation layer 201. The arraignment of voids 212 may be randomly generated, shown in FIG. 6 where there is a random generation of pinhole voids 212 within insulation layer 201. Printing provides good control over the placement of the voids in the insulation layer but is currently a slower and less uniformly porous process as compared to CCVD or AP-PECVD.

In open air atmospheric pressure plasma-enhanced chemical vapor deposition "AP-PECVD", a chemical precursor gas or a mix of precursor gasses are put into a plasma state and the resulting reaction produces an ionized vapor of the intended insulator which is then used to deposit the material by charge-based attraction. The deposition of the vapor molecules is random. AP-PECVD deposition may be used to create a thin porous particulate layer of insulation where the adjustment of the thinnest of the material creates more or less voids. An AP-PECVD process with a polysiloxane precursor can be used alone or in combination with other deposition processes such as the CCVD process both simultaneously and on a different layer to impart a higher layer impedance as compared to CCVD deposited SiO2 alone.

In CCVD, a burner will initiate a chemical combustion reaction by flame which is usually the combustion of propane or butane with oxygen. A precursor chemical is then injected into the flame where it reacts to form an insulator such as $SiO_2$. The molecular scale $SiO_2$ exiting the flame is very hot and quickly combines with other $SiO_2$ molecules to form larger hot $SiO_2$ clumps which fall as a type of snow on the deposition surface. The hot $SiO_2$ clumps then adhere well to the conductive metal surface and to each other to form a porous $SiO_2$ material. The speed at which the deposition surface passes under the combustion flame and the distance the surface is from the flame will determine the consistency and thickness of the coating as well as the temperature compatibility with patterning dry film or photoresist. More than one CCVD precursor chemical can be used as a mixture or in series to form complex oxides for various performance reasons.

At the time of writing, only products such as oxides of the transition metals: zinc, zirconium, titanium, silver, tungsten, and molybdenum; post-transition metals: tin, aluminum; and metalloid: silicon are generally known to be practical and useful to form by CCVD. Of these elements, silicon produces a high impedance porous oxide that is advantageous for its cost, environmental, electrical, thermal, mechanical and lack of conductive properties by forming silicon dioxide in a combustion reaction. This may change as new and better precursors are developed. Insulative precursor chemicals are chosen on the basis of cost, coverage percentage, overall electrical or mechanical performance of the insulative material or any combination of these characteristics and may be a mix of chemicals.

Combustion reactions grant a silicon atom two oxygen atoms to become silicon dioxide (SiO2). However, in practice, it is not pure silicon that is combusted, instead, there are a variety of silicon dioxide precursors and oxidants that may be used to arrive at $SiO_2$ via a combustion reaction, including but not limited to polysiloxanes and the class to which polysiloxanes belong. One $SiO_2$ precursor suitable for electroplating is trademarked Pyrosil and allows for the $SiO_2$ to be formed at low-cost and deposited quickly enough to avoid dry film thermal damage. Any CCVD compatible non-conductive insulative material >500 μohm·cm that is also compatible with the pH of the electroplating solution will yield improvements over frequency vs. Bulk copper alone using the "through-insulator" electroplating method.

In general, multiple precursors may be used to form a porous insulation layer and, in such cases, the insulative precursor materials may be premixed and deposited in the same flame, plasma, or ink, or co-deposited in separate flames, plasmas or inks, or separately deposited at different times.

CCVD parameters for depositing an insulative wire layer include the airflow to the flame, the rate of fuel available and the rate of the chemical precursor being fed into the flame resulting in a bluish orange tinted uniform. Prior to the injection of the chemical precursor the flame should appear as any proper propane, natural gas, or butane "blue" flame. A typical efficient flame and a large number of uniformly placed burner heads of openings is required for consistent uniform deposition of the insulative material.

Figure 7:
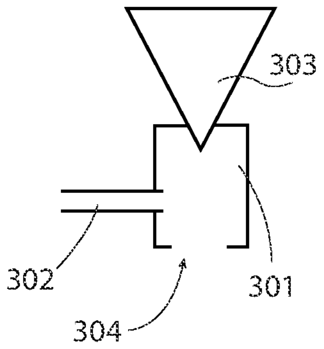
FIG. 7 is a sectional view of an exemplary embodiment of the present invention showing a combustion chamber apparatus used in CCVD.

Referring to CCVD as demonstrative of the control of deposition principles, FIG. 7 shows a possible burner head for use in CCVD. The burner head has an open chamber 101 which contains the oxidant. A nozzle 302 is connected to chamber 301 and this nozzle 302 injects the precursor into chamber 301. At the base of chamber 301 is a burner 303. Burner 303 utilizes a secondary combustion reaction to generate a flame that will heat the precursor as it enters chamber 301 and the oxidant that is in chamber 301 to drive their combustion. The product will exit the chamber through hole 304.

Figure 8:
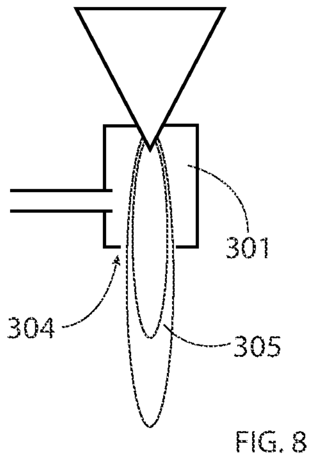
FIG. 8 is a sectional view of an exemplary embodiment of the present invention showing a combustion chamber apparatus used in CCVD expelling flame.

As shown in FIG. 8 flame 305 of the reaction may exit chamber 301. Thus, not all of the reaction necessarily will occur in the chamber as flame 305 will generate a force that pushes out some of the reactants through hole 304. However, given the heat, most of the reaction will occur in chamber 301 and it will be the products that are pushed out of chamber 301 by the combustion 305.

Figure 9:
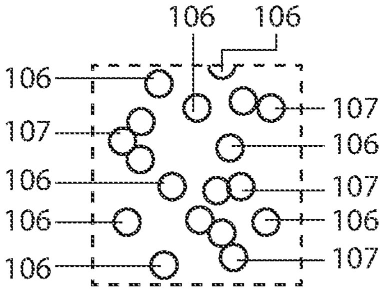
FIG. 9 is a perspective view of an exemplary embodiment of the present invention showing molecule interactions as the molecules exit a combustion chamber during the CCVD deposition.

As the insulation molecules are ejected from the combustion chamber, they may collide with each other and fuse to form clumps of molecules. Thus, there will be a collection of individual reactant product molecules as well as clumps of products leaving the combustion chamber. These individual molecules and clumps may be called particulates. FIG. 9 shows a mixture of individual molecules 106 and molecule clumps 107 after being ejected from a combustion chamber. There is a myriad of possible interactions among the molecules and the actual set of interactions occurs chaotically. The molecules, including clumps, are in motion and may continue to collide as they fall. Molecules may land on each other on the recipient and bond with each other.

Typically, these clumps will be under a nanometer in size. In the case of $SiO_2$, depending on the arraignment of molecules and the form of $SiO_2$ it may take as little as two $SiO_2$ molecules to come together to form a 1 nanometer-long clump. The products of the CCVD reaction are atomic and thus the produced layers are measurable on the nanoscale. The clumps are on average less than ten nanometers across, but the size may be adjusted by adjusting the parameters of CCVD.

The products of the reaction will generally leave the combustion chamber, being ejected primarily by the combustion of gas towards a recipient surface. Given the molecular interactions that occur as the product moves between a combustion chamber and a recipient, the product will be deposited onto the recipient in a statistical bell curve manner with the highest deposition rate being directly under the flame, thus a large number of burner heads or burner openings and sufficient distance from where the combustion occurs to the recipient surface are required for uniform deposition.

Figure 10:
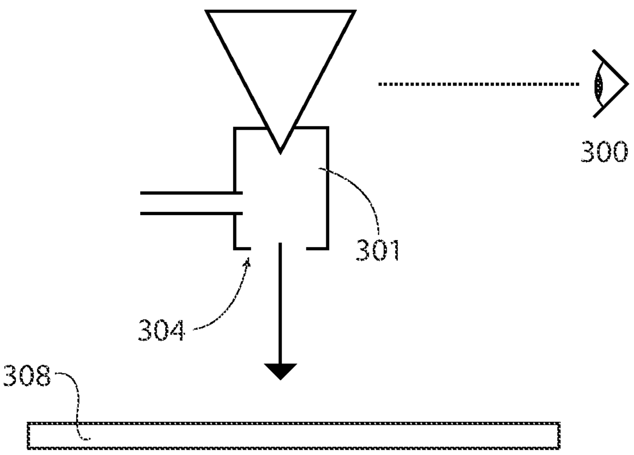
FIG. 10 is a perspective view of an exemplary embodiment of the present invention showing a combustion chamber apparatus placed above a recipient.
Figure 11:
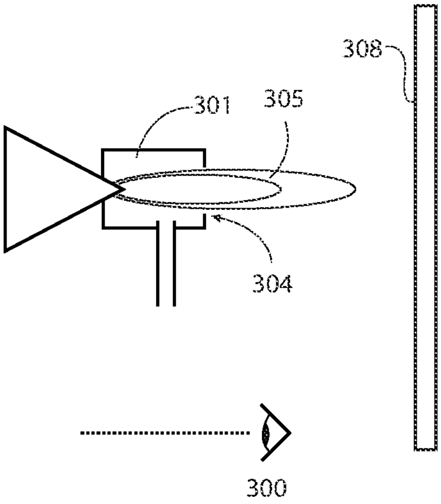
FIG. 11 is a perspective view of an exemplary embodiment of the present invention showing a combustion chamber apparatus placed to the side of a recipient.

The longer the $SiO_2$ particles are accelerated onto the recipient surface the more the porous insulation will cover the recipient. Thus, combustion chamber 301 may be held in a location over recipient 308 as shown in FIG. 10. In FIG. 10 and FIG. 11, eye 300 represents the eye of a standing person and is used for a directional reference. The combustion chamber 301 and the recipient 308 may be closer than twenty centimeters even if the combustion flame touches the recipient, and in AP-PECVD deposition the recipient may be closer than twenty centimeters to the plasma as well.

Combustion chamber 301 may be in any location around recipient 308. For example, a combustion chamber 301 ejects by combustion 305 through hole 304 particulates to a recipient 308 placed to the side of combustion chamber 308 as shown in FIG. 11. This is useful if the recipient is hung on a chain in the style of an assembly line or is to be dipped into an electroplating bath.

Figure 12:
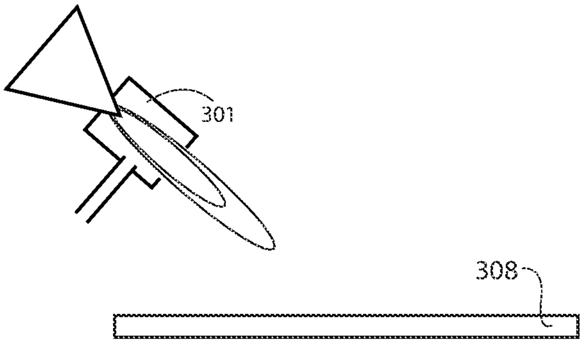
FIG. 12 is a perspective view of an exemplary embodiment of the present invention showing a combustion chamber apparatus placed at an angle to the recipient.

The angle of both the recipient and the burner may be any angle suitable for creating a hybrid material. FIG. 12 shows a recipient 308 at a forty-five-degree angle to the combustion chamber 301. Angling recipient 308 may allow for more surface area of the recipient to be covered by the vapor coming from the combustion chamber or for one area of recipient 308 to receive a thicker, porous layer than another area.

It will be appreciated that CCVD is a highly versatile method of deposition. This versatility allows it to integrate with many forms of wire formation without a significant increase in cost.

In at least one exemplary embodiment, the burner may move as it deposits the porous insulation layer. This may be useful for rapidly depositing insulation layers on multiple recipients or depositing on larger recipients. In the situation shown in FIG. 13 the vapor particulates 130 coming from the combustion chamber 301 do not fall over the entirety of the recipient 308 surfaces. Moving the combustion chamber 301 could allow the single burner to cover the entire recipient 308 surfaces with a deposit.

Figure 13:
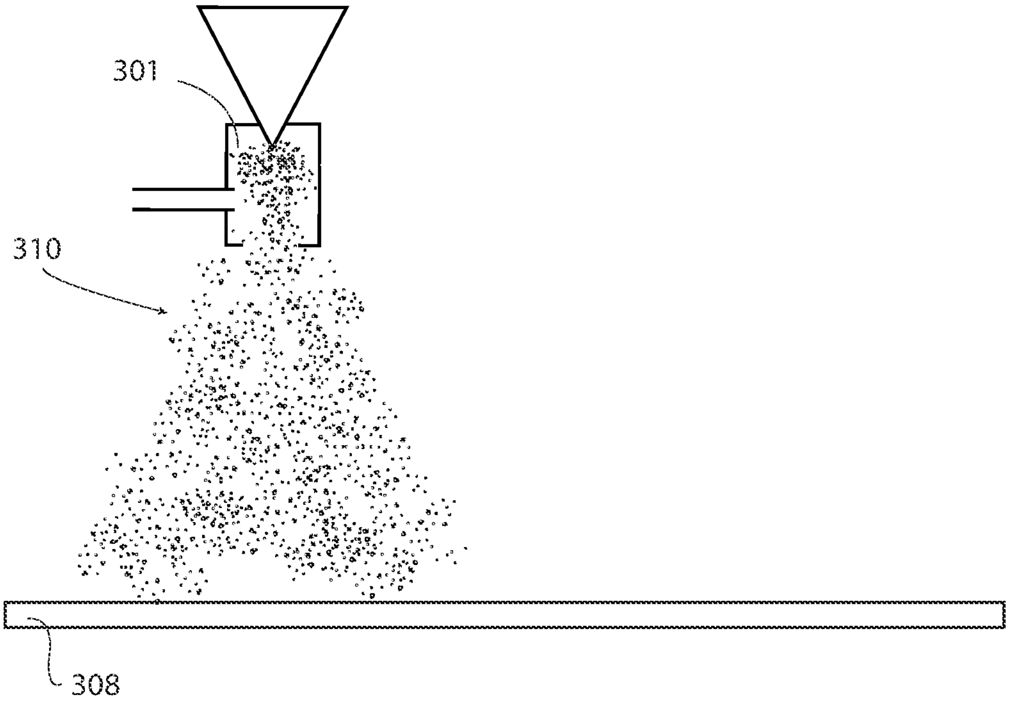
FIG. 13 is a perspective view of an exemplary embodiment of the present invention showing a combustion chamber apparatus placed above the recipient and depositing an insulation layer.

In at least one exemplary embodiment the recipient may move; this is one possible solution to the situation shown in FIG. 13. In FIG. 13 the recipient 308 may be moved so that each surface portion of the recipient 308 that should be covered may come in the range of the vapor 130. The recipient may move at a rate exceeding one meter per minute. The recipient may include the pattern from dry film patterning or photoresist patterning processes so that the dry film, for example, receives a portion of the insulation deposit. The dry film or photoresist is then easily removed using standard stripping techniques due to the porous nature of the insulative material which allows the stripping chemicals to reach the dry film or photoresist.

The movement of the burner or the recipient in at least one exemplary embodiment includes a rotational movement that allows the burner to coat a side more evenly or to coat multiple sides of the recipient.

Figure 14:
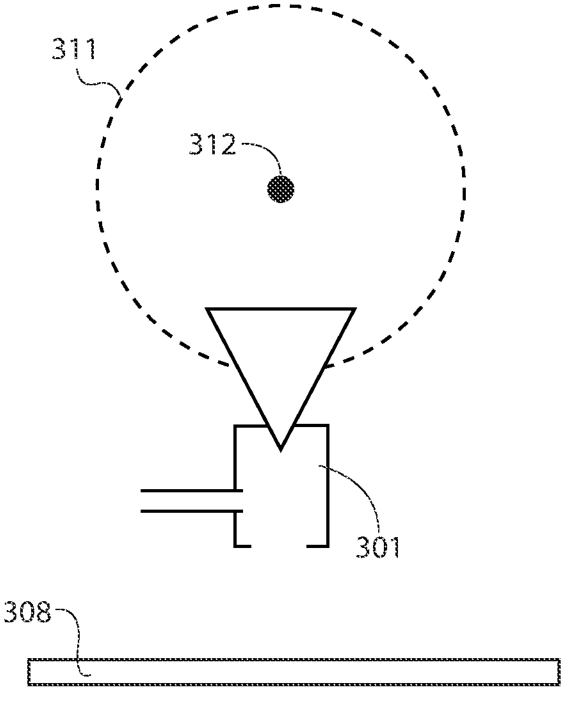
FIG. 14 is a perspective view of an exemplary embodiment of the present invention showing a combustion chamber apparatus placed above the recipient in a rotatable manner.

FIG. 14 shows a combustion chamber 301 that may rotate along path 311 around point 312. This can generate a tilting motion, and it may be useful for depositing on a single recipient that is larger than the area of deposition or depositing on multiple portions of a recipient 308 surface while leaving some portion of the surface uncovered.

Figure 15:
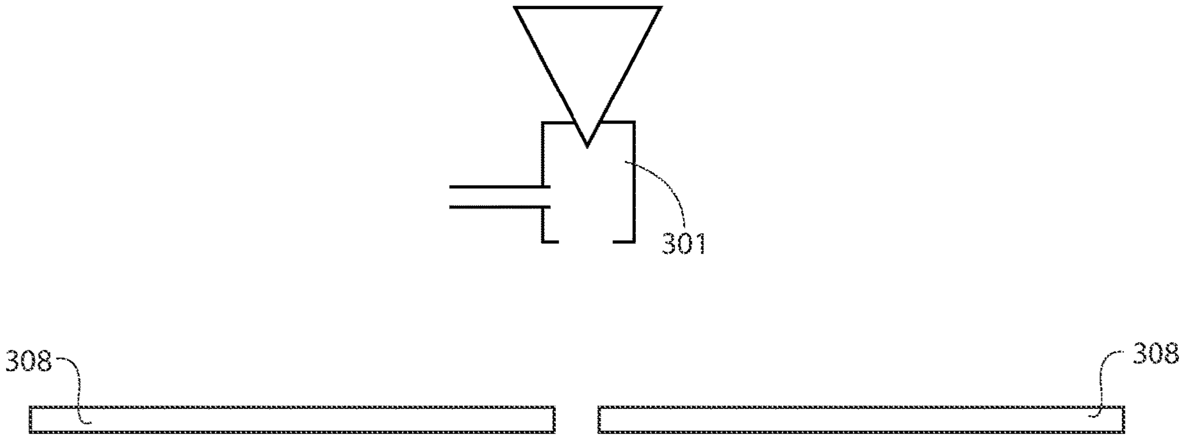
FIG. 15 is a perspective view of an exemplary embodiment of the present invention showing a combustion chamber apparatus placed above multiple recipients.

It is also possible to utilize multiple recipients under a single burner as FIG. 15 shows a combustion chamber 301 placed over two recipient 308 which it coats, to coat the recipient 308 at different rates the combustion chamber 308 may have some filter to control the vapor flow to each of the recipients. The recipient 308 arrangement of FIG. 15 may occur if recipients are passed under a continuous vapor stream from the combustion chamber 301.

Figure 16:
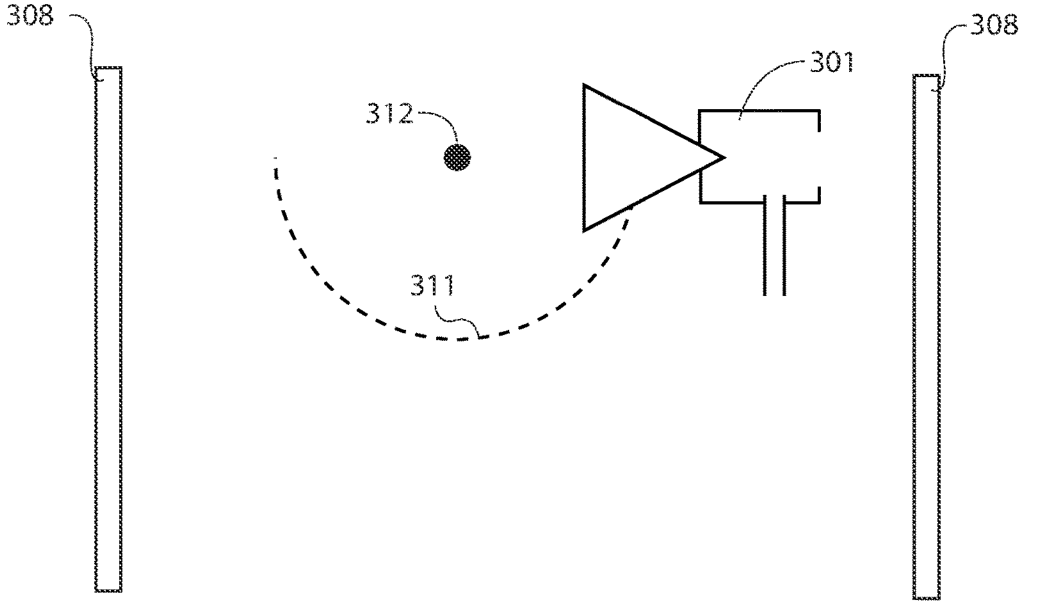
FIG. 16 is a perspective view of an exemplary embodiment of the present invention showing a combustion chamber apparatus placed to the side of multiple recipients and rotatable between the recipients.

In at least one exemplary embodiment burners may move between recipients. FIG. 16 shows combustion chamber 301 with a recipient 308 positioned to one side of the combustion chamber 301 and a second recipient 308 on the opposite of the combustion chamber 301. In this example, the combustion chamber 301 may rotate or move, for example along line 311 around point 312, so that it may coat both recipients 308.

Figure 17:
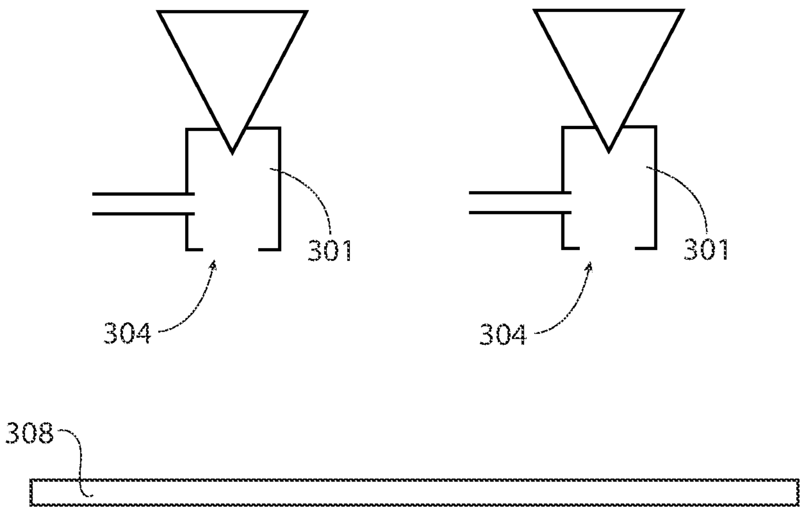
FIG. 17 is a perspective view of an exemplary embodiment of the present invention showing multiple combustion chamber apparatuses placed above a single recipients.

Multiple burners may be used to plate a single recipient reducing any shadowing effects or turbulence that may occur due to the different profile heights of the material, patterned dry film, or any other interfering structure present on the component or deposition machine. FIG. 17 shows two stationary combustion chambers 301 over a single recipient 308 this is one method of allowing more of the surface area of the recipient 308 to be coated at once. Other methods for depositing on multiple recipients include moving the recipient or combustion chambers, using a bigger combustion chamber, varying the nozzle 304 of the combustion chamber, the size of the combustion chamber, the distance of the combustion chamber from the recipient, or the properties of the combustion reaction occurring in the combustion chamber.

Figure 18:
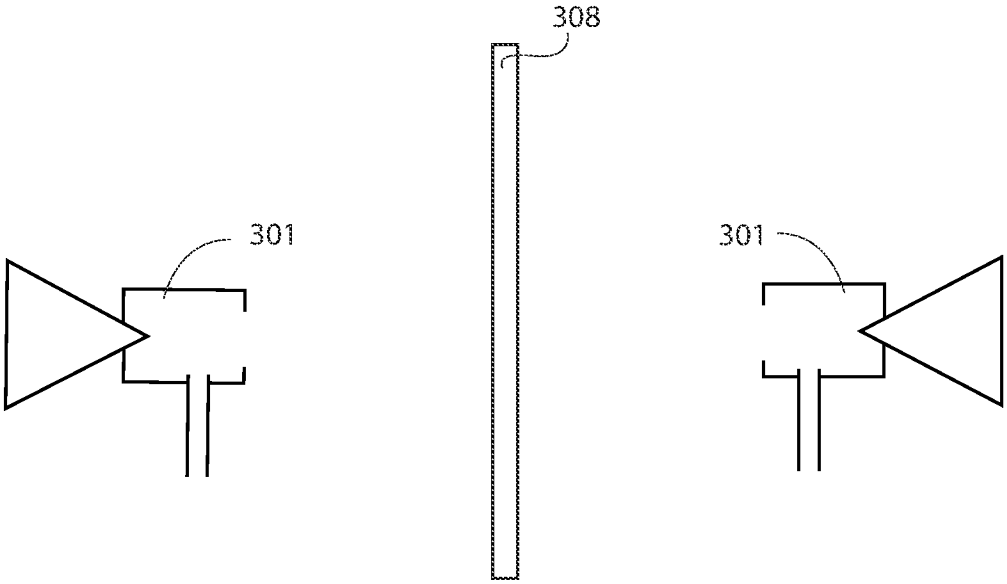
FIG. 18 is a perspective view of an exemplary embodiment of the present invention showing multiple combustion chamber apparatuses placed on at least two different sides of a single recipient.

FIG. 18 shows two combustion chambers 301, the combustion chambers 301 are configured to each plate on a different side of the recipient 308. This demonstrates an example showing that with the use of multiple burners, multiple sides of a recipient 308 may be plated at once. Using multiple combustion chambers 301 helps prevent cornrowing which occurs when the area directly under a combustion chamber 301 receives more material than the other areas.

In at least one exemplary embodiment multiple burners may move. Movable burners may be used in conjunction with stationary burners. The recipient may move even with multiple burners.

There are several considerations related to the combustion reaction and layer formation to consider when placing a combustion chamber. These factors may be tuned to the placement of the combustion chamber, or the combustion chamber may be placed to fulfill a predetermined set of parameters. The parameters of CCVD all balance with each other so considering one may require tweaking the other.

Figure 19A:
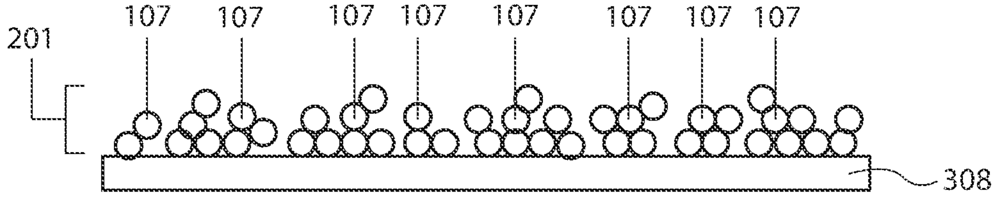
FIG. 19*a*, FIG. 19*b*, FIG. 19*c*, and FIG. 19*d* are a perspective views of an exemplary embodiment of the present invention showing a porous insulation layer formed on a conductive material with attention called to different peaks and valleys of the invention and where
Figure 19B:
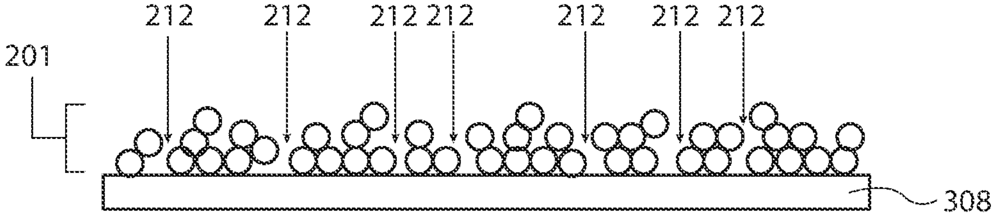

FIG. 19*a* and FIG. 19*b* show a CCVD product layer 201 plated onto a recipient forming molecule clumps 202. This particulate nature also holds true for AP-PECVD deposition. The product 201 layer is made of molecule clumps 107. This product layer 201 gives an example of the random distribution of the porous particulate layer from a CCVD process. It is important to note that certain voids 212 are created between the molecule clumps 107 that leave portions of the recipient 308 exposed. It is nearly impossible to eradicate or fill all voids 212 by continuing to deposit product by CCVD given the random distribution and nano-scale size of the molecule clumps falling or being ejected from the combustion chamber.

Thus, when CCVD is used to form a layer, the layer has some voids which leave a percentage of the recipient surface uncovered. This is an intrinsic property of CCVD product layers and the use of CCVD in this present invention intends to, and does, utilize this property of the product layers formed by CCVD.

The voids of FIG. 19*b* are non-limiting examples of randomly formed voids (demonstrating that in fact, the voids can take a variety of shapes). The voids can come in any shape the CCVD product can form in three dimensions, and every time a CCVD product layer is formed, the voids will be randomized in both shape and location. It will again be appreciated that the use of CCVD in this invention is for the purpose of cheaply achieving product layers with these voids.

The product layers of CCVD may be thin and rough as well. As the combustion products fall like molecular snow onto the recipient it is simple to get a layer that is very thin—even down to single molecules in some areas, by reducing the time of deposition.

Figure 19C:
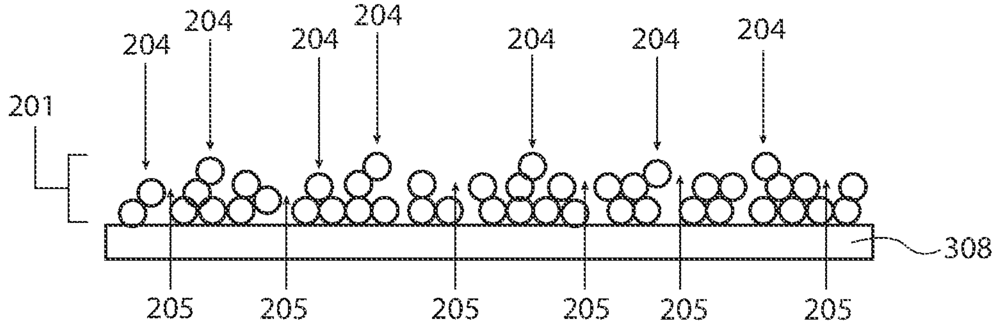
Figure 19D:
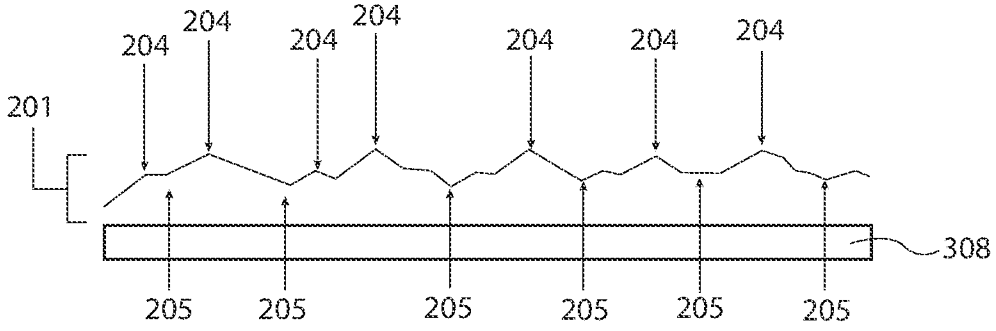

Given that the molecules randomly distribute, the molecules and clumps will present a rough surface full of peaks 204 and valleys 205 as shown in FIG. 19*c* where the peaks are clumps of molecules and FIG. 19*d* which gives a linear approximation of the same molecule clumps to show peaks and valleys more clearly. This current invention realizes that this roughness can provide a mechanical bonding means with a subsequent layer in an electroplating process. It is further counterintuitive to use rough layers because it introduces inefficiencies such as longer paths for current. However, the benefits here outweigh the downsides of a potentially increased distance for current.

CCVD, therefore, can be used to generate thin, rough, porous layers through voids on the surface of the recipient. Any form or modification to the CCVD process that still results in the voids in the porous product layers may be utilized in the present invention. There exist modifications to the CCVD process such as r-CCVD which are still suitable for the purpose of the invention. However, the use of CCVD with a Pryosil precursor is a cheap, effective, and easily available method of generating a useful porous insulation layer.

The present invention allows wires to be built at ½ to ¼th of the thickness of current solutions for a similar performance and cost as the electronic component thickness is determined by the skin depth of the conductor. The end products may then be integrated into smartphones, tablets, notebooks, earbuds, IoT devices, and all devices that use conductive components allowing designers to produce thinner consumer products or reduce the price of these products through simplified industrial design.

A randomly formed porous layer pushes the boundaries of what is possible in conductor design by having voids that leave some portion of the underlying recipient uncovered, as shown by FIG. 19*a* for example. The amount of the underlying recipient that is covered by the $SiO_2$ is called the coverage percentage. A porous layer may be a solid insulation layer intentionally designed to have an arrangement of voids or defects in its coverage of the underlying layer or it may be a randomly generated particulate layer.

The voids through the porous layer allow for the underlying and overlying conductive material layers to bond with each other. Therefore, the simple steps of CCVD onto a recipient followed by the plating of a subsequent wire layer will allow the layers to interact and bond with each other if the two layers would ordinarily bond or otherwise interact with each other. In at least one exemplary embodiment of the present invention, there are no special steps required between the plating of the porous layer and the conductive materials. Therefore, you can plate a conductive material layer, wash and dry the surface, then deposit an insulation layer, and immediately electroplate another conductive material layer without even lifting the original wire patterning (e.g., original photo resist or dry film) to produce a patterned hybrid material.

In addition to the cost savings associated with a reduction in patterning mask steps, a single masking step provides the patterned hybrid materials with straight edges because the pattern which defines the edge of a material is never replaced and thus avoids any micro-shifting from pattern replacements and alignment tolerances. The straight edges hold true for other patterning processes in additive manufacturing, including photo resists. The ability to keep a straight edge removes a large source of reliability issues as compared to other multi-layer wires which require the resetting of patterns. Typically, one new pattern is required to form every new layer, and thus are subject to layer misalignments, less conductive material as the layering continues, adhesion issues, and excessive process material and chemical waste in a much more energy intensive process.

The CCVD-formed insulation layers and electroplated magnetic layers perform and are simulated as a new material with its own unique skin effect and a unique and strong directional impedance instead of a true multi-layer conductor where each layer is heavily or wholly isolated from the others. These unique properties vary by the layering thickness and as such new conductive material variations can easily be designed for frequency response, conductive permeability, and skin depth as required for the end application.

The porous layer can be integrated into any conductive material that is electroplatable.

In most cases, a recipient is plated, the porous layer deposited, and a subsequent layer deposited. However, the CCVD porous layer may also form an initial layer or a final layer which in many cases is beneficial for adhesion.

The conductive material can be formed into a conductive wire of any type, form, or shape. Typically, a conductive material will be a single material such as a copper; however, to add other properties, for example, to control thermal expansion or increase the resistivity of the insulation layer, combinations of materials such as, including non-conductive materials such as NiP, may be used within the wire. The CCVD and AP-PECVD processes described in this invention are still able to produce an insulation layer for wires that include materials that are not conductive in combination with conductive materials.

Porous insulation deposition methods may also be used to form insulation layers in conjunction with other insulation forming methods; this may allow hybrid materials to serve themselves as layers in a traditional multi-layer wire. The elegance of CCVD allows for the low-cost implementation of CCVD into almost any electroplating methodology, including DC plating, Pulse Plating, Reverse Pulse Plating or a combination of these methods.

In at least one exemplary embodiment, a wire utilizes a $SiO_2$ porous layer. FIG. 19*a* shows a porous layer 202. The $SiO_2$ particulates themselves have insulative properties, but the layer is not solid, as can be seen in FIG. 19*b* as the $SiO_2$ layer 202 has $SiO_2$ voids 203. Although the ability to prevent eddy currents is reduced when compared to a solid layer of $SiO_2$.

Figure 20:
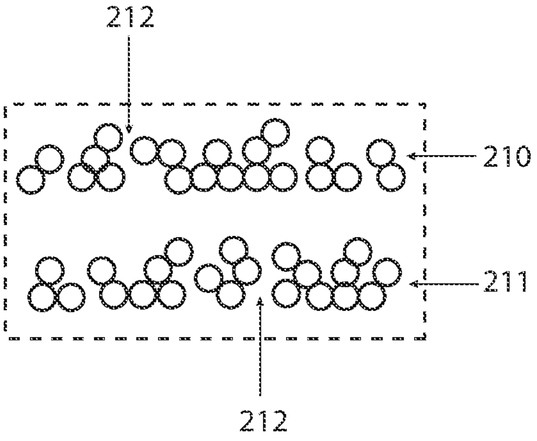
FIG. 20 is a section view of the present embodiment showing offset voids in the porous insulation layers.
Figure 21:
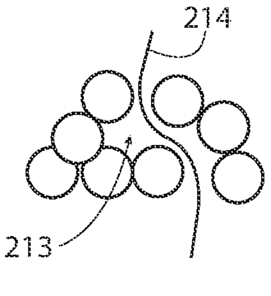
FIG. 21 is a sectional view of a porous gap showing that to avoid insulation the current path would have to curve.

Yet, the voids are typically offset when multiple porous layers are used. Given the small size of the voids it is unlikely that random voids will overlap. This is shown in FIG. 20 where two porous layers are shown, porous layer 210 and porous layer 211, and each porous layer has at least one gap 212 that is offset from the voids of the other layer. So, although in one layer there is a gap that does not provide an insulative effect, at the next layer there is insulation, thus increasing the edge current path length which increases the resistivity which in turn reduces the eddy current. Further, the voids themselves are not by necessity linear, and an example of a crooked gap is shown in FIG. 21 where gap 213 is a nonlinear void such that to avoid the insulation layer a winding pathing 213 would be required.

The offset voids when a first layer is created with at least one additional layer mean that the pathways that eddy currents could take through the layers provide some resistance compared to a linear pathway. The fact that the voids may also be non-linear has the effect of reducing the eddy current slightly as well. The use of $SiO_2$ allows for a robust insulation layer even when thin and porous. In non-particulate porous insulation layers, which have or may have systematically formed voids, for example, printed porous insulation layers, the voids may be purposely offset from each other.

Figure 22:
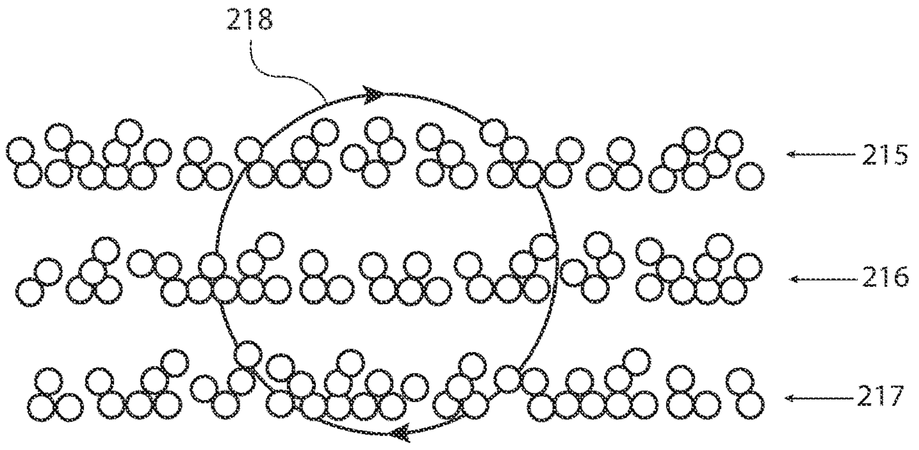
FIG. 22 is a sectional view of three porous insulation layers with an eddy current pathway shown.

FIG. 22 shows three porous insulation layers: layer 215, layer 216, and layer 217. An eddy current 218 runs through the insulation layers and is reduced in strength by each of the insulation layers that it passes through.

Figure 23:
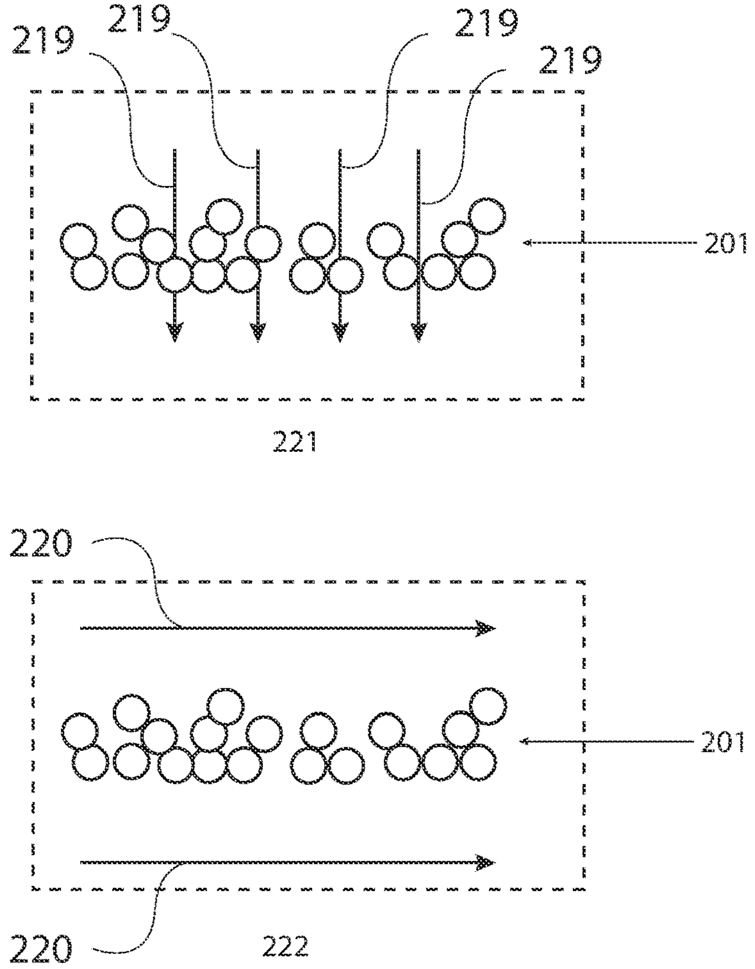
FIG. 23 is a sectional view of an exemplary embodiment of the present invention comparing vertical and horizontal current pathways to highlight the directional impedance of the present invention.

Eddy current runs perpendicular to conductive flux lines. FIG. 23 shows two blocks of hybrid material with insulation layers, block 221 and block 222. Each block has the same porous insulation layer 201 and block 221 has vertical pathway lines 219 while block 222 has horizontal pathway lines 220. Lines 220 in block 222 do not cross insulation layer 201. However, lines 219 in block 221 represent the perpendicular pathway that an eddy current conductive flux would take if conductive flux lines followed the lines of block 222. Thus, it can be seen that these porous layers give an insulative effect that only limits the pathways directionally. Given that the material into which a porous layer has been plated takes the properties of a new material and essentially becomes a new material, it can be said to become a material with directional impedance.

The more insulation layers an eddy current path would cross, the weaker the realized eddy current. Each insulation layer adds resistance against eddy currents; therefore, finer layering increases the frequency response of the conductive material as the eddy current must cross an insulative boundary.

Figure 24:
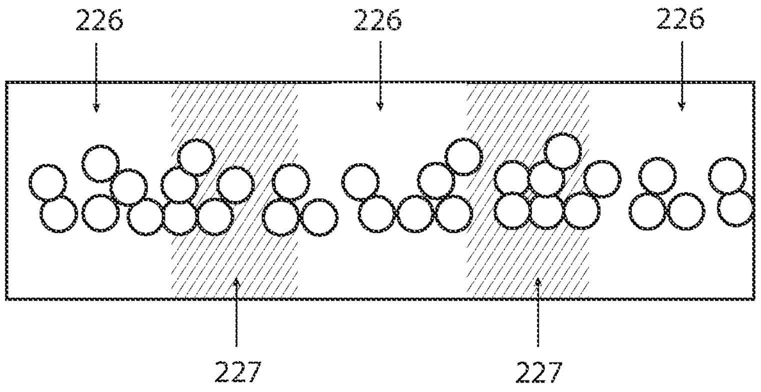
FIG. 24 is a perspective view of the present invention showing alternating vertical layers of conductive material.

Each layer that is placed down may comprise several materials. The layer may be a homogenous mix of materials, or it may have a heterogeneous arrangement. A homogeneous mix of materials is a mix of materials where each material is evenly distributed throughout the layer. A heterogeneous mix of materials is a mix of materials where the material is distinctly defined within the layer, for example, in FIG. 24 where a first material 226 distinctly alternates with a second material 227. Given the nature of porous layers, as long as the recipient and subsequent layer will plate with each other, the layers can be plated through a porous layer, and as long as the layers are useful for forming a conductive wire, the layers may be used in a hybrid material mass.

Figure 25:
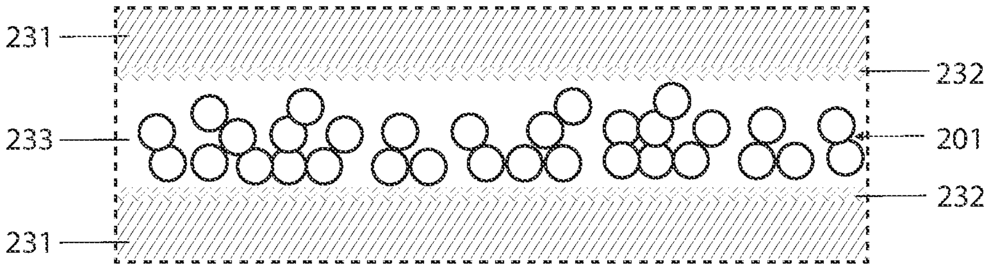
FIG. 25 is a perspective view of the present invention showing alternating horizontal layers of conductive material.
Figure 26:
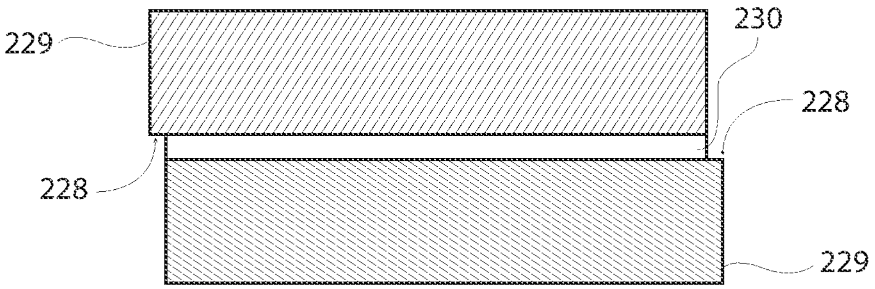
FIG. 26 is a perspective view of a multi-layer conductive material with a traditional lamination layer showing layer offset.

The hybrid material may have multiple metal layers before a porous insulation layer. For example, FIG. 25 shows a hybrid material having a porous insulation layer 201, conductive layers 231, 232, and 233 where 231 is a first metal, 232 a second metal, and 233 a third metal. Any arrangement of conductive layers is possible. FIG. 26 shows a metal layer 233 which is for the purpose of filling the voids of insulation layer 201 and does not exceed the boundaries of insulation layer 201.

With $SiO_2$ as a porous layer, when electroplating, the material that is being deposited will only plate onto the material of the recipient and not the $SiO_2$, which is effectively inert in an electroplating bath. Therefore, the electroplating layer will start in the voids of the porous layer where the recipient is exposed. The electroplated layer will build up until the porous layer is filled with the electroplated layer, and then the electroplating layer will build out the subsequent layer encapsulating the particulates. Therefore, the voids of the porous layer do not become air voids but are instead filled with the plated material, as shown in FIG. 3*b*.

Once plated, the porous layers enhance bonding with the subsequent layers by mechanical means. The porous layers are rough, having peaks and valleys as shown in FIGS. 19*c* and 19*d*; this rough surface provides a means of mechanical bonding by entangling the porous layer with the subsequent layer—strengthening the material. The pattern of the porous layer is random, and therefore the entanglement is random. Mechanical bonding provides increased protection against shear forces.

The strength of the hybrid material is also increased over true multi-layer wires because the two layers around the porous layer will bond to each other and thus become like one layer of material. A true multi-layer wire will have separated conductive layers so that the conductive layers must rely on the strength of their bond with their adjacent smooth insulation layers to resist separating forces. Since with the porous layer, hybrid wire layers are connected, hybrid wire is stronger against mechanical stress than a multi-layer wire with smooth insulation and unconnected conductive layers.

With porous particulate insulation layers the nature of the particulates (insulation molecule clumps) makes it practical to drill or etch or undermine and sweep away with any number of layers. For example, silicon dioxide as a solid layer is not conducive to subtractive manufacturing processes and is quite chemically inert and is commonly removed with Hydrofluoric acid "HF" which is an extremely dangerous chemical requiring specialized equipment, training and personal protection. $SiO_2$ has a hardness of 7 on the Mohs scale for minerals, which goes up to 10. As such, $SiO_2$ itself is resistant to many tools commonly used to manipulate or refine conductive wires. When in a solid non-porous layer, $SiO_2$ is too strong to be practically manipulated with classic drilling or etching processes. However, CCVD deposits the silicon dioxide as groupings of particulates that are loosely connected to each other and have voids that allow the non-porous insulative layers to cross through the porous layer. As hinted by the discussion of pulse plating, in porous form, the particulates of $SiO_2$ will come loose with whatever layer they were deposited on.

In a drilling process, the $SiO_2$ layer particulates will be moved by the force of the drill as the $SiO_2$ particulates are not bonded to each other and do not present much resistance to any drill that can drill through the material around the porous layer. Although the particulates themselves are tough and would be hard to drill through—they will leave the conductive layer just like any other drill dust from that layer.

In an etch process, for example, a wet etch, a pattern is formed on the material to be etched. A chemical is then poured onto the material, and it will etch the material according to the pattern. Etching Silicon Dioxide, when it is in a solid non-porous layer form, requires its own set of strong chemicals and considerations separate from the materials which may surround it. However, in a particulate porous-based material, for example, as formed by CCVD, whatever chemical can etch the materials around the $SiO_2$ layer will be able to remove the particulates of the insulation layer. As the etching process will be able to remove everything around the particulates of the porous layer so that the particulates are free from the material and will get washed out even if the $SiO_2$ particulates will themselves not react with the acid.

The ability to perform subtractive manufacturing processes in a practical and low-cost method opens the door for new conductive wire designs to be used. The porous layers are easy to place and work with. For example, in cases of electroplating when a film is used, where, as noted above, there is no need to replace the dry film when using CCVD given the ability to through-plate through the porous layer. The dry film does not need to be removed even if the CCVD burner will deposit the product on the dry film. Thus, with CCVD, you can have a single burner depositing a porous layer on the entire wafer. As insulative layers for hybrid wires themselves do not serve as electrodes the electroplated layers will not form on the $SiO_2$. Thus, the presence of $SiO_2$ or other insulator on the dry film does not affect the electroplating steps. When the dry film is removed, the particulates on the dry film will be removed as well.

A true multi-layer conductor layer will require replacing the dry film between the formation of each insulation layer. Alignment tolerances in replacing a dry film pattern will often result in misaligned sidewalls. FIG. 26 shows a true multi-layer wire having a conductive layer 229 and insulation layer 230. The replacement of the dry film has left an offset 228 between each of the multi-layer layers.

Figure 27:
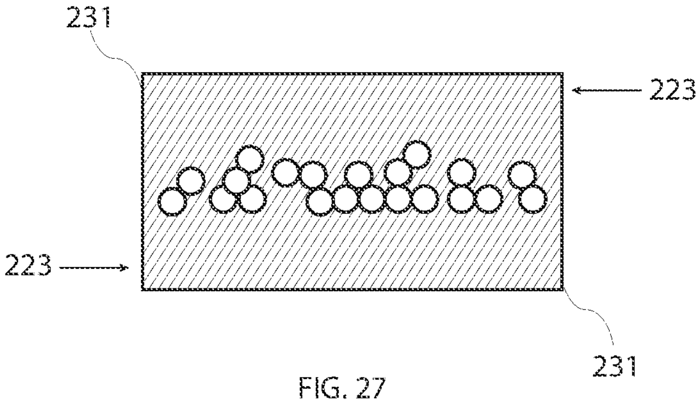
FIG. 27 is a perspective view of hybrid conductive material without layer offset.

A hybrid conductive wire will present a smooth edge 231, as shown in FIG. 27. Here, conductive wire layers 223 were built using the same dry film pattern. Therefore, edges 231 are not offset but stay smooth for the entire wire height for as long as a single dry film layer or pattern is used. A hybrid wire built by dry film patterning will have a side wall smoothness that matches the smoothness of the dry film used. In at least one exemplary embodiment, multiple hybrid materials masses may be stacked with true lamination layers as shown in FIG. 26.

Embodiments of the invention incorporate many methods of electroplating including DC plating, pulse plating, reverse pulse plating, and jet electroplating or any combination of these plating methods. The present invention is an elegant solution to adding an insulative layer without adding significant extra steps and, in general, will require far fewer steps than a true multi-layer wire. Multi-layer components, in general, require multiple steps to switch between the formation of one layer and the next type or material. However, the conductive material and CCVD insulation process of the present invention is as simple as 1. plating a layer in a bath, pulling it out, 2. washing, 3. drying, and 4. depositing the insulative layer onto it. Thin-film conductive multi-layer materials or wires can be realized in four steps as opposed to thirteen or fourteen, which are the general industry practice known at the time of writing.

In at least one exemplary embodiment the voids in the insulation layer regardless of method of producing the insulation layer are such that the voids are individually between 30 nm and Sum, the insulation leaves 3 to 5 percent of the underlying metallic layer exposed, however, exposures of 15% to 0.01% have been found to have economic value. Voids of up to 40 μm, for example 22 μm, in width can be statistically acceptable if the prevalence is low.

The hybrid material of the present invention behaves as if it is a single material in terms of plating and elegantly integrates into conductive wire plating processes. However, there are many suboptimal processes which may take advantage of one or more of the key inventions that make up the novel conductive material process. Embodiments of the present invention, include various suboptimal methods of introducing voids in insulation result in a reduction of layering patterns for example with electrostatic discharge, radiation, laser, grinding, or polishing produce to voids 40 μm or smaller at an relatively even density in a regular or random fashion or any other insulation deposition method or post-insulation deposition method that is designed to introduce the necessary voids, porosity, or gaps necessary to immediately begin electroplating following the insulative deposition including by thinning a deposited nonporous insulation layer.

Figure 28:
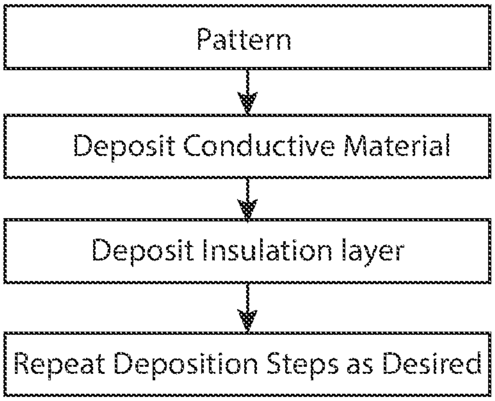
FIG. 28 is a flowchart of an exemplary method of the present invention.

FIG. 28 is a flowchart of the plating steps, in at least one exemplary embodiment of the present invention, in what is essentially a two-step repeatable process not including washing and drying. The hybrid material is either patterned or not depending on the application. The second step is to deposit metallic metal on the first recipient which is followed by the deposition of the porous layer. The deposition of the recipient and porous layer steps may be repeated in order as desired. At least one embodiment varies the thickness of a layer at least once in this process and at least one embodiment varies the composition of a layer compared to at least one other layer at least once.

Figure 29A:
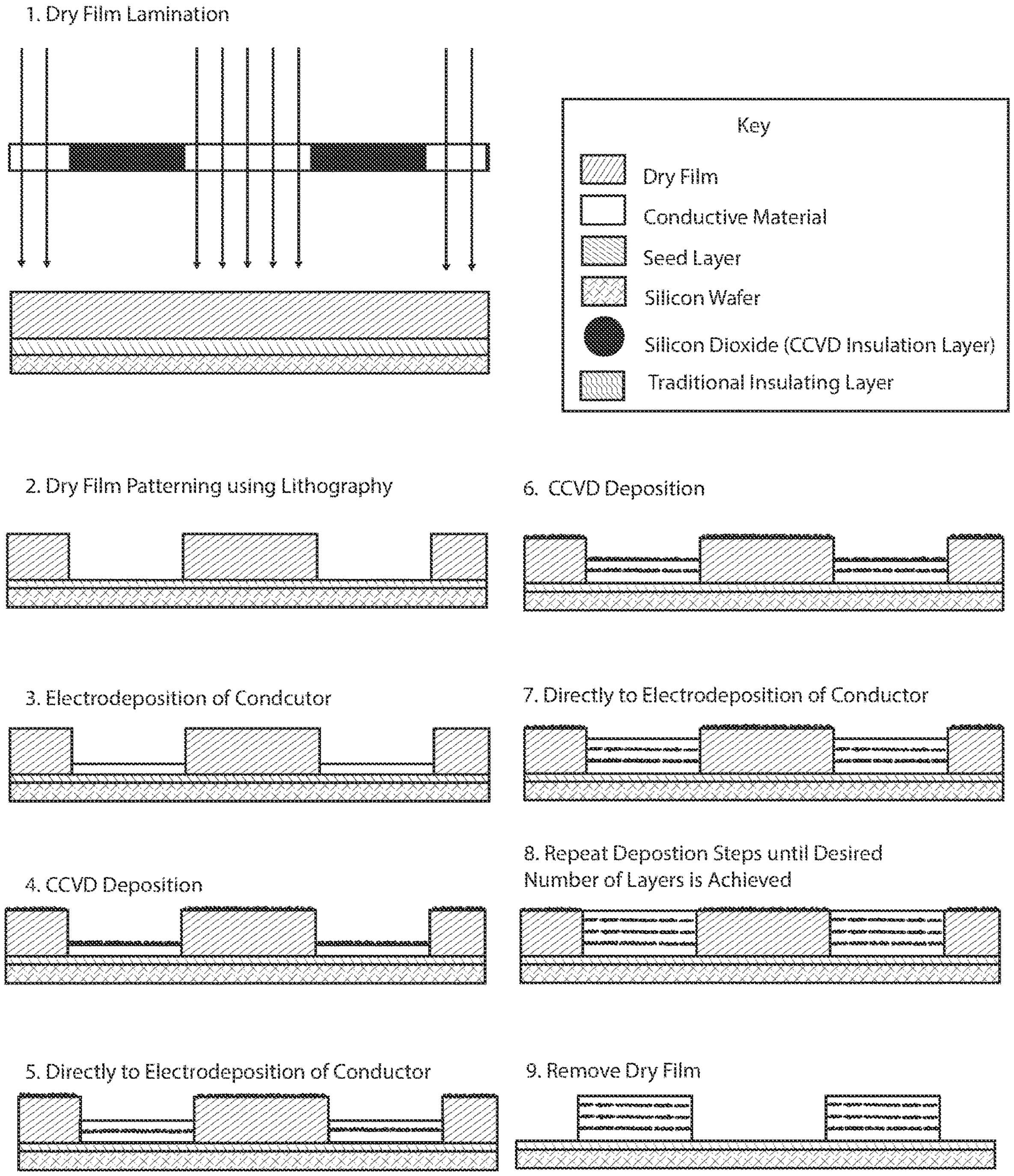
FIG. 29*a* and FIG. 29*b* are a two-page flowchart illustrating the steps of an exemplary embodiment of the present invention which utilizes CCVD and electroplating.

FIG. 29*a* provides an example of how each step of FIG. 29 plays out in the formation of a hybrid wire by CCVD. Step one shows the dry film patterning to form a wire. In at least one exemplary embodiment, as shown in FIG. 29*a*, more than one wire can be patterned at a time. Step two shows that the layer has been patterned. Step three shows the first conductive layer having been deposited. Step four shows the CCVD process has been used to plate a porous insulation layer. The insulation layer is deposited on both the dry film and the recipient. Step five shows a subsequent conductive wire layer is then plated onto the porous layer. Step six shows the deposition of the porous layer. Step seven shows the plating of a conductive layer. Step eight shows a potential end result of repeating the recipient deposition and the insulation deposition steps. Step nine shows the step of removing the dry film.

If additional material is required that exceeds the thickness of the patterning dry film, or if the material's vertical impedance begins to limit electroplating performance, then the dry film is to be removed, the original electroless copper layer is etched away, and a new insulation layer is added, typically an epoxy plastic. This insulation fills the area where the dry film was located and is rolled or vacuum pressed into all voids so that it presents a flat surface even with the final layer. Onto this flat surface, an electroless copper layer is plated to form a seed layer. A film is placed onto this seed layer which is again patterned.

Figure 29B:
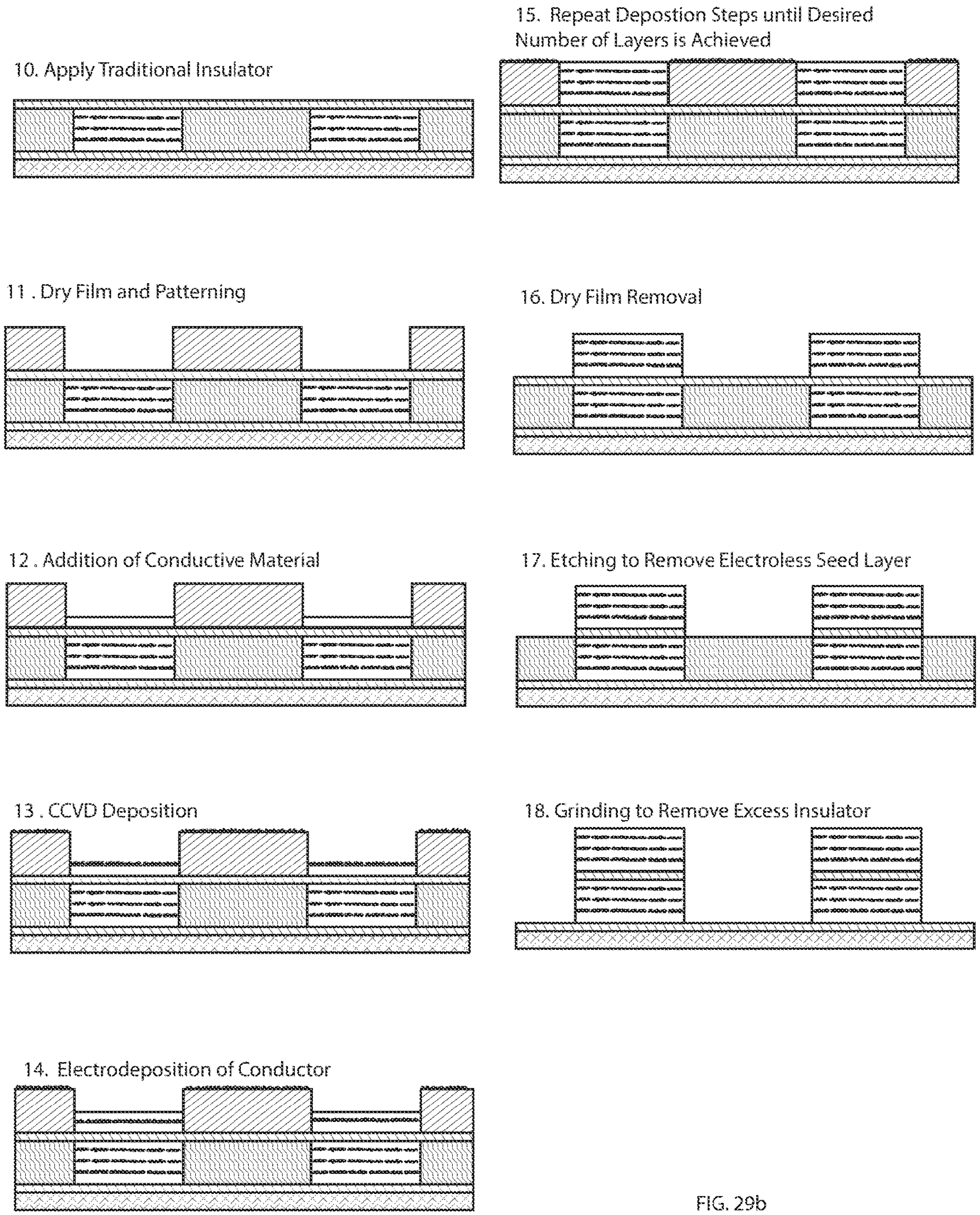

Thus, FIG. 29*b*, shows an additional process that may be performed after the height of the dry film is reached or if the conductive wire shall be a hybrid wire with a true lamination layer integrated within. Step ten shows the placement of a traditional insulator and seed layer to provide a flat surface to build the subsequent wire layers. Step eleven shows a new patterned dry film. Step twelve shows the deposition of the first conductive wire layer. Step twelve shows the deposition of the porous layer. Step thirteen shows a potential end result of repeating the recipient deposition and the insulation deposition steps. Step fourteen shows the removal of dry film. Step fifteen shows the etching to remove the seed layer. Step eighteen shows the result of a grinding step to remove excess insulators.

Figure 30:
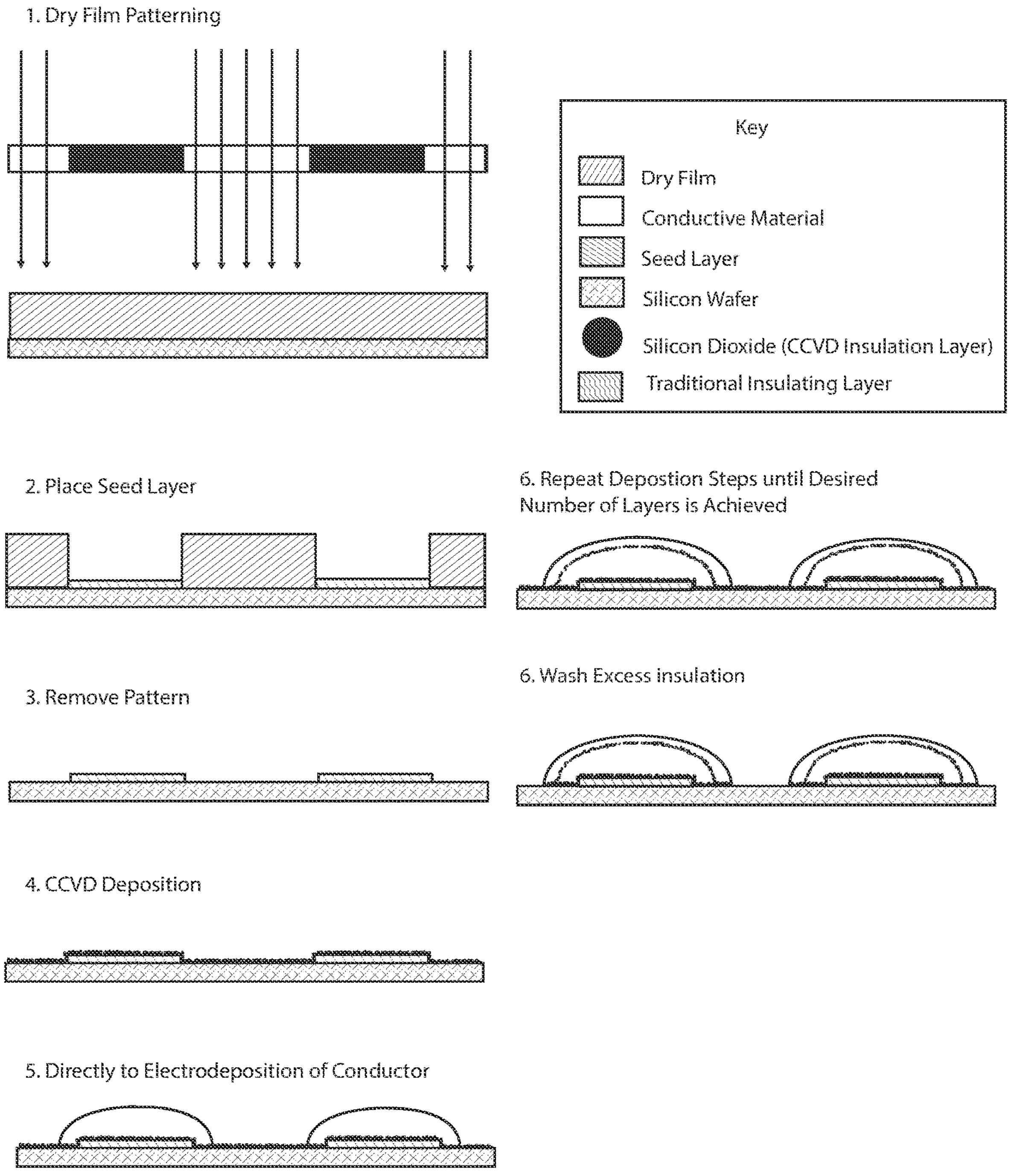
FIG. 30 is a flowchart illustrating the steps of an exemplary embodiment of the present invention which utilizes pig tail style plating with CCVD and electroplating methods.

A modification of the embodiment shown in FIGS. 29*a* and 29*b* may be used to form rounded hybrid materials. Here as shown in FIG. 30 a pattern is formed and then a seed layer is placed, for example, by a dry film patterned etch followed by the formation of a copper seed layer. This is followed by removal of the pattern and the layering process proceeds with no edge boundary resulting in a pearl like layered structure. There is no need to deposit an additional electroless seed layer or an electroplated pigtail sacrificial layer to form an electrode for the next layer after the formation of the porous insulation layers. This rounded structure has some electrical benefits at high frequency where sharp corners can cause impedance mismatch.

Because the electroplated wire with porous insulation layer is built up layer by layer, air voids and other modifications can be added to the wire by building up the layers according to the relevant patterning process, for example, an air-gapped wire pattern for an air-gapped wire.

Because there is no need for special intermediary steps for the formation of the porous layer, such as preparing the recipient for receiving the porous layer or re-patterning for the porous layer, the CCVD process can be integrated into many pre-existing plating processes without limiting the shapes that the plating processes can produce.

It is not necessary to exclude true laminated insulation layers from wires that also have porous layers. Therefore, in at least one exemplary embodiment, a multi-layered wire is a series of hybrid wires with a traditional insulation layer between the wires. Embodiments, whether multilayered conductors or hybrid conductors, can have different layer thicknesses of any measurement best suited to have desirable properties for a particular task or implementation of the component.

Electrical components which are built with copper traces by traditional plating or etching processes can also be built with the new conductive hybrid material of the present invention. Electrical components which require high-frequency performance may be built either much smaller with similar performance or at the same size but with higher performance as measured by impedance, Q, and frequency bandwidth when using the new material over a non-hybrid single material wire.

The hybrid material can be used to reduce the insertion loss of for GHz signals in communications systems, improve RF antenna sensitivity, improve the power efficiency of a wireless charging coil, improve the Q of inductors, transformers, and filters by simply replacing a previously used conductive material with lower performance.

After the initial copper layer, which is deposited in a traditional manner, all subsequent layers utilize the new CCVD $SiO_2$ and electroplating through-insulator method, in what is essentially a 3-step process. The layering process comprises simply electro-depositing copper, cleaning by washing, performing a $SiO_2$ CCVD, and repeating. The electroplating of copper on the new $SiO_2$ layer consists of putting the $SiO_2$ layer and its underlying copper layer directly back into the copper electrodeposition plating bath to plate a new copper layer. The existing dry film that patterned the prior copper layer does not need to be removed because it is process compatible with being over-coated with the $SiO_2$ CCVD dozens of times. Because the prior layer's dry film patterning does not need to be removed, there is no need for a new dry film patterning step. As these process steps are eliminated, so too are the intermediate process steps such as cleaning, etching, or abrading the conductor, insulator, or dry film.

Figure 31:
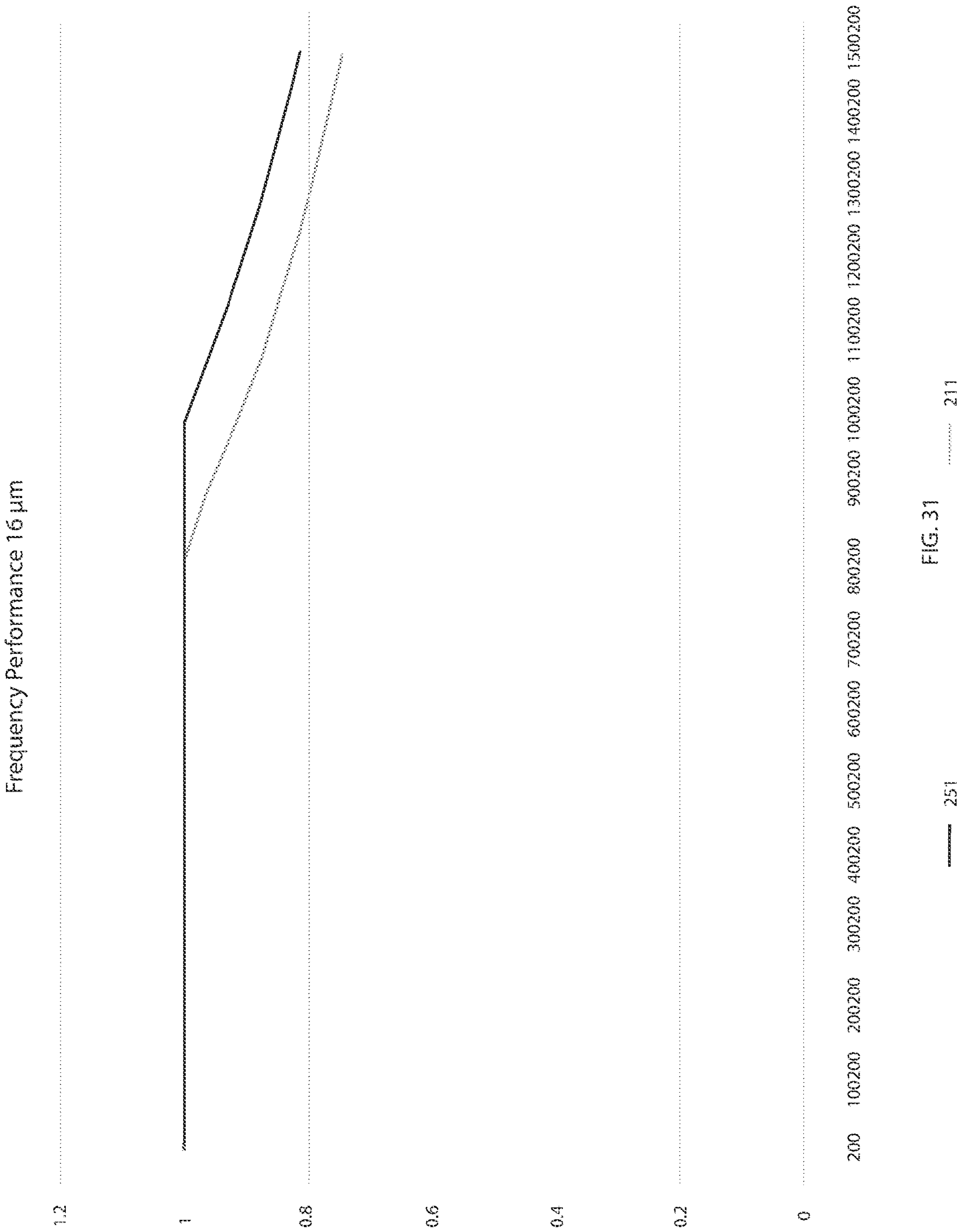
FIG. 31 is a graph showing resistance of hybrid material having a non-conductive layer filling the voids of the porous insulation layers.
Figure 32:
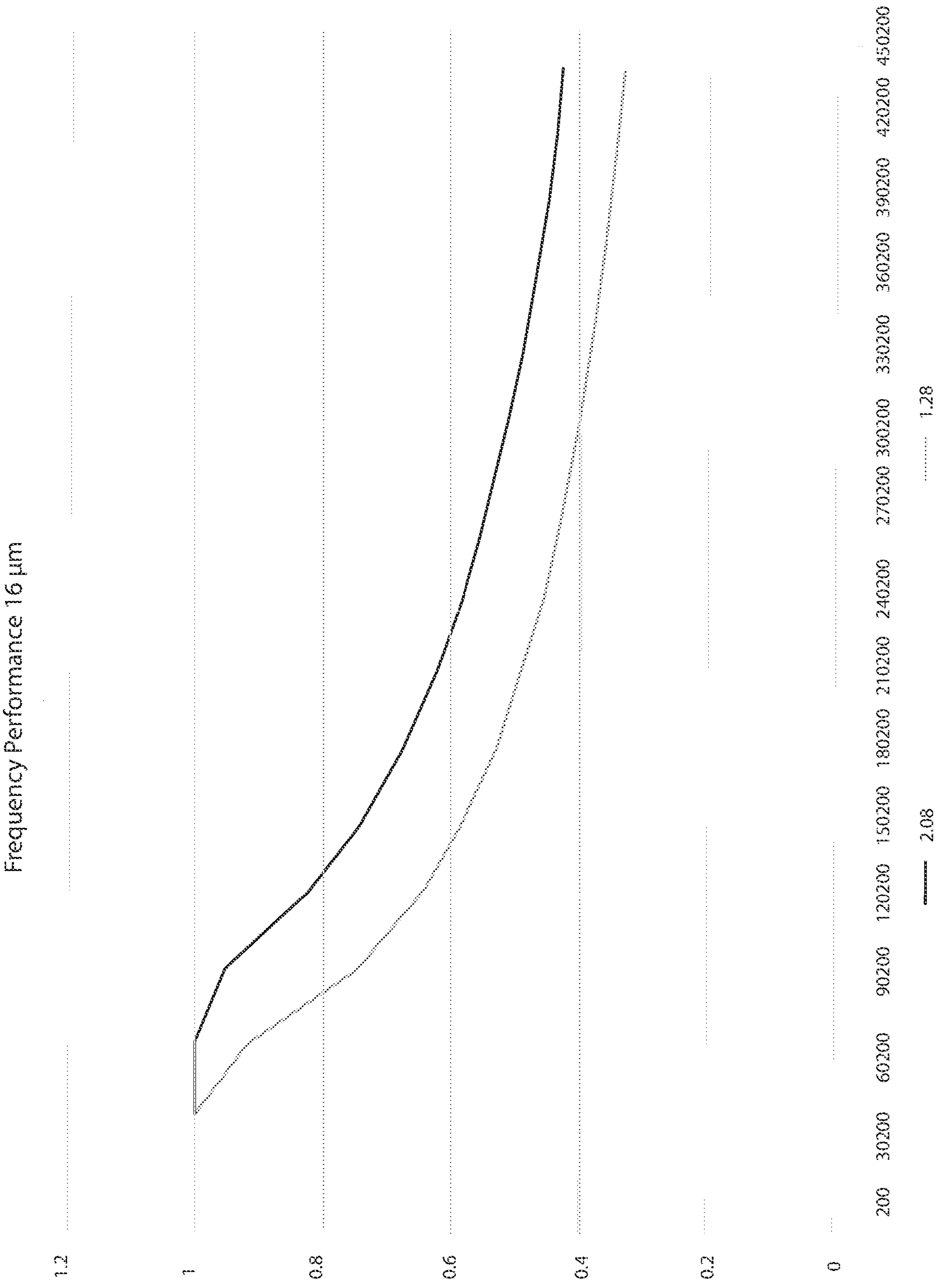
FIG. 32 is a graph showing resistance of hybrid material having a conductive layer filling the voids of the porous insulation layers at different frequencies.
Figure 33:
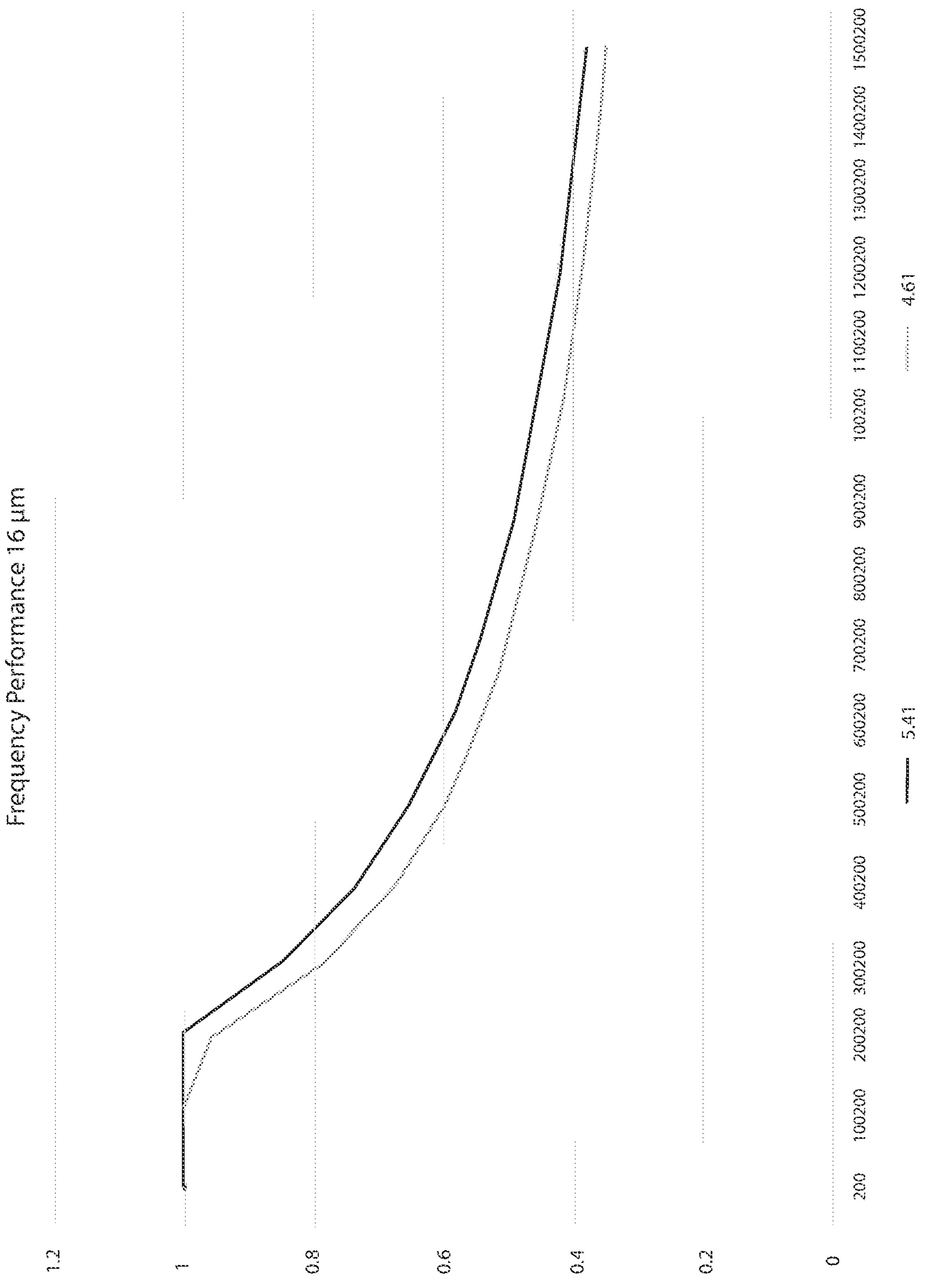
FIG. 33 is a graph showing resistance of bulk copper at different frequencies and this is a typical conductive material.

Additional materials can be added into hybrid material layering to enhance the traits of the conductor including materials which affect the directional impedance of the hybrid material without altering the ease of forming the hybrid material. For example, after the initial copper layer, a 4-step process can also be employed for even more high frequency conductor performance. The fourth step is an addition of material which is used to fill the voids of the porous insulation layer. For example, Nickel Phosphorus "NiP" where the Phosphorus is greater than 6% ideally between 30 and 13% which gives a material resistivity of ~130 μohm·cm is used to fill the voids. With porous $SiO_2$ deposited by CCVD covering 95% of the prior layer, the insulative layer after NiP is deposited has an impedance of 2200 μohm·cm. This much higher insulative impedance cuts eddy currents dramatically. As shown in FIG. 31, Resistance remains relatively flat to around 9 GHz for 16 μm total composite material thickness with individual copper layers at −0.6 μm. FIG. 32 shows a copper-based hybrid material of similar size but with copper filling the insulator has resistance that remains relatively flat to around 800 MHz. FIG. 33 shows a pure bulk copper material of the similar size has resistance that remains relatively flat to around 200 MHz.

Because the layers from the hybrid process divide the conductive material lengthwise, in order for the intended benefits to be optimized, the current should run lengthwise through the wire as well.

In the microelectronics industry especially, many components may be layered vertically in a system. This is seen often in system-in-package, system-on-package, or system-on-chip systems or in lead frames, or in general. Therefore, the conductive material of the present invention must be able to connect to components that are in a direction perpendicular to its intended current flow. This need occurs, for example, when the conductive material forms a wire that lays horizontally. If the components above the wire simply connect to the top of the layered wire, then the current will have to cross the insulating silica layers to travel the length of the wire, as shown in FIG. 34.

Figure 34:
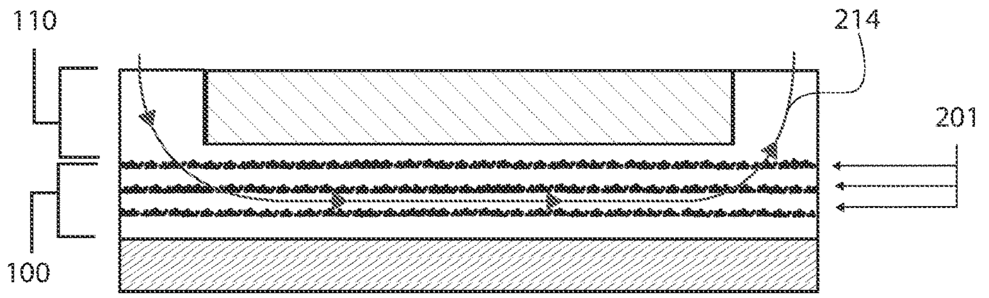
FIG. 34 is a perspective view of an exemplary embodiment of the present invention connected to a vertical layer without the use of connectors.

In FIG. 34 a hybrid copper wire 100 has to connect to a layer 110 above it. The copper wire has $SiO_2$ porous insulation layers 201 which run perpendicular to the layer stack. So, current paths, for example, path 214 which are to use hybrid copper wire 100 must cross insulation layers 201. This reduces the efficiency of hybrid copper wire 100.

Figure 35:
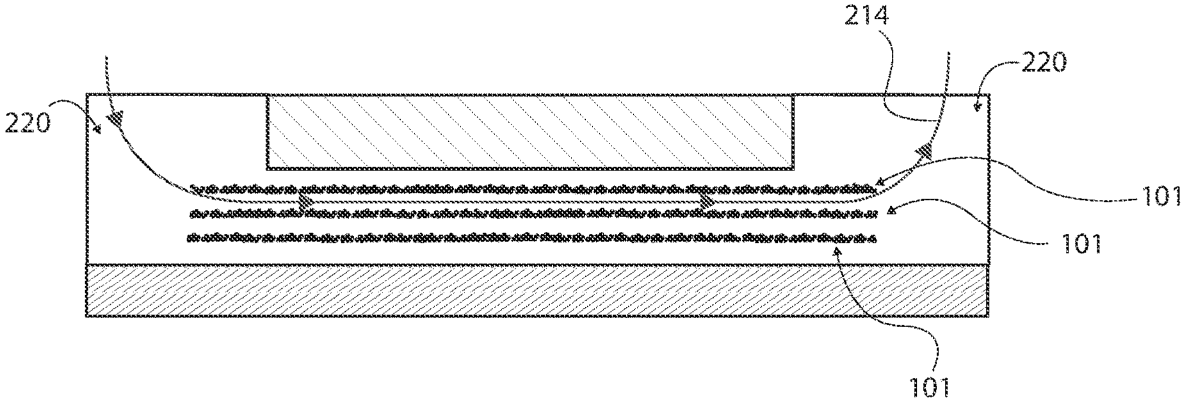
FIG. 35 is a perspective view of an exemplary embodiment of the present invention connected to a vertical layer with the use of connectors.

Therefore, as shown in FIG. 35, by providing a connector 220, which is a mass of conductive material without intervening porous insulation layers, at the ends of the wire 100, a component that is placed above the wire can vertically connect to the connector instead of the wire. Because the connector has no insulation layers, the current 214 can enter it in one direction and leave the connector at an angle off its entry direction without crossing insulation layers 101. This makes connector 220 suitable for taking current and allowing that current to reorient itself to best pass through the wire. The connector also can take current from the wire and allow that current to orient itself to best enter the next component of the system. An example current pathway through a first connector, the wire, and a final connector is shown in FIG. 35.

Figure 36:
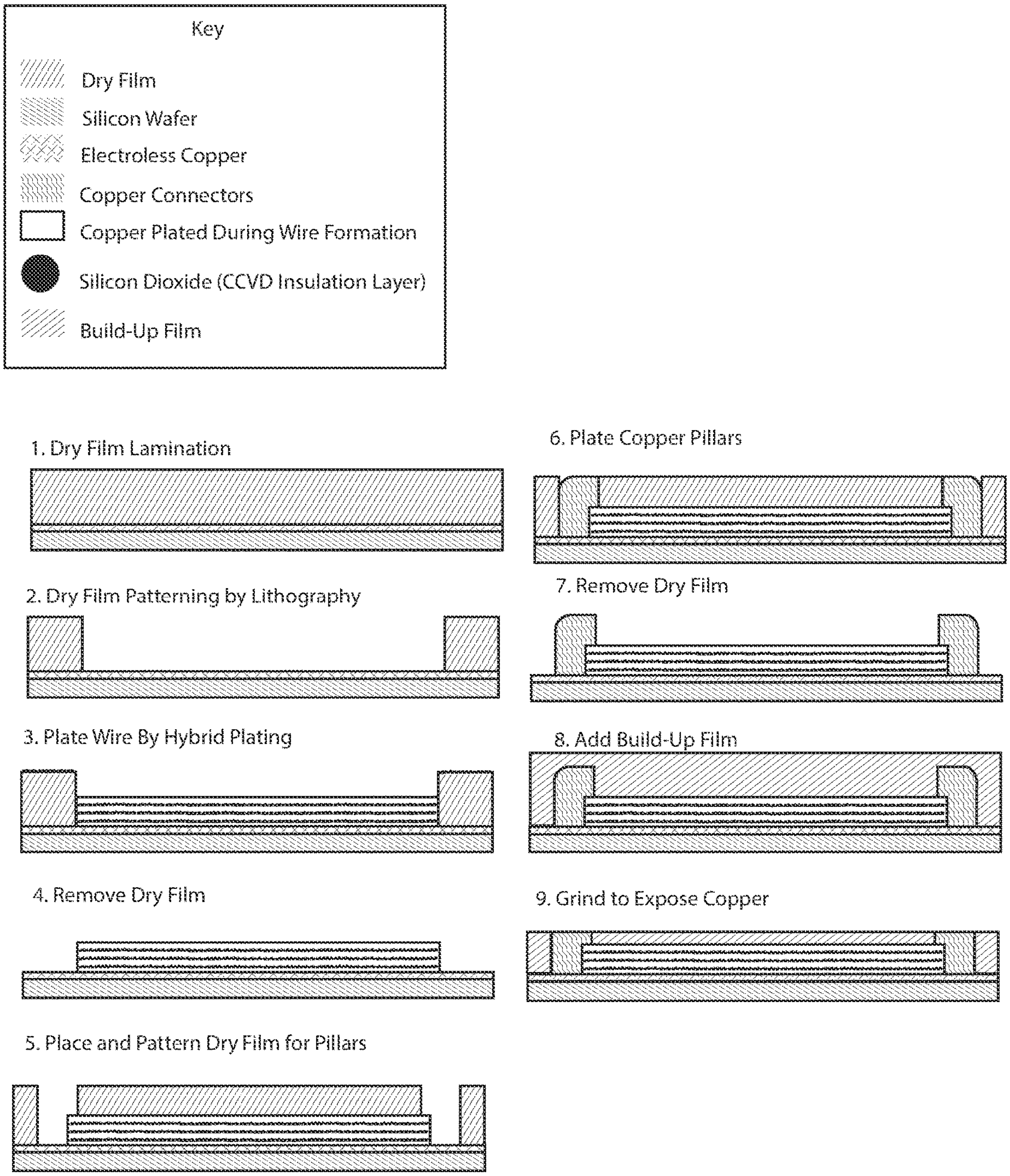
FIG. 36 is a flowchart of an exemplary method of the present invention for forming connectors with the hybrid material such that hybrid material is formed before the connectors.

In order to cost-effectively integrate the connectors 220 with the wire, it may be created as part of the wire manufacturing process, even if that process is a Hybrid process. In a preferred method of creating the connector and conductive material of the present invention, the wire is first created, and then two connectors are created at the ends of the wire, as shown in FIG. 36. The first step in this method is to create the wire with its horizontal layers. This is achieved by starting with a dry film process on an electroless seed layer where a pattern is shaped as a wire. An initial conductive layer is electroplated onto the seed layer according to the pattern. Then a porous insulation layer is deposited, and a conductive layer is electroplated onto the porous insulation layer—using the previous conductive layer as the electrode. The electroplating of a conductor and porous insulation layer processes may be repeated until the desired number of layers is achieved. The pattern is then removed, and a new pattern is installed and shaped so that pillars can be plated at the ends of the wire. These pillars may be copper for example, and will serve as connectors. As shown in FIG. 36, the new pattern will leave a negligible portion of the ends of the top surface of the wire uncovered. The pillars will be plated and will rise above the wire. Therefore, the pillars may fully cover the ends of the wire so that the current will not have to pass through any insulation regardless of the layer on the wire it may travel down. The pillars will not initially be perfectly level due to the portion plated onto the wire. However, once the pillars are plated, black build-up film is added to cover the copper pillars, and a grinding step occurs to level and expose the pillars to enable them to connect electrically with other components of the system.

Figure 37:
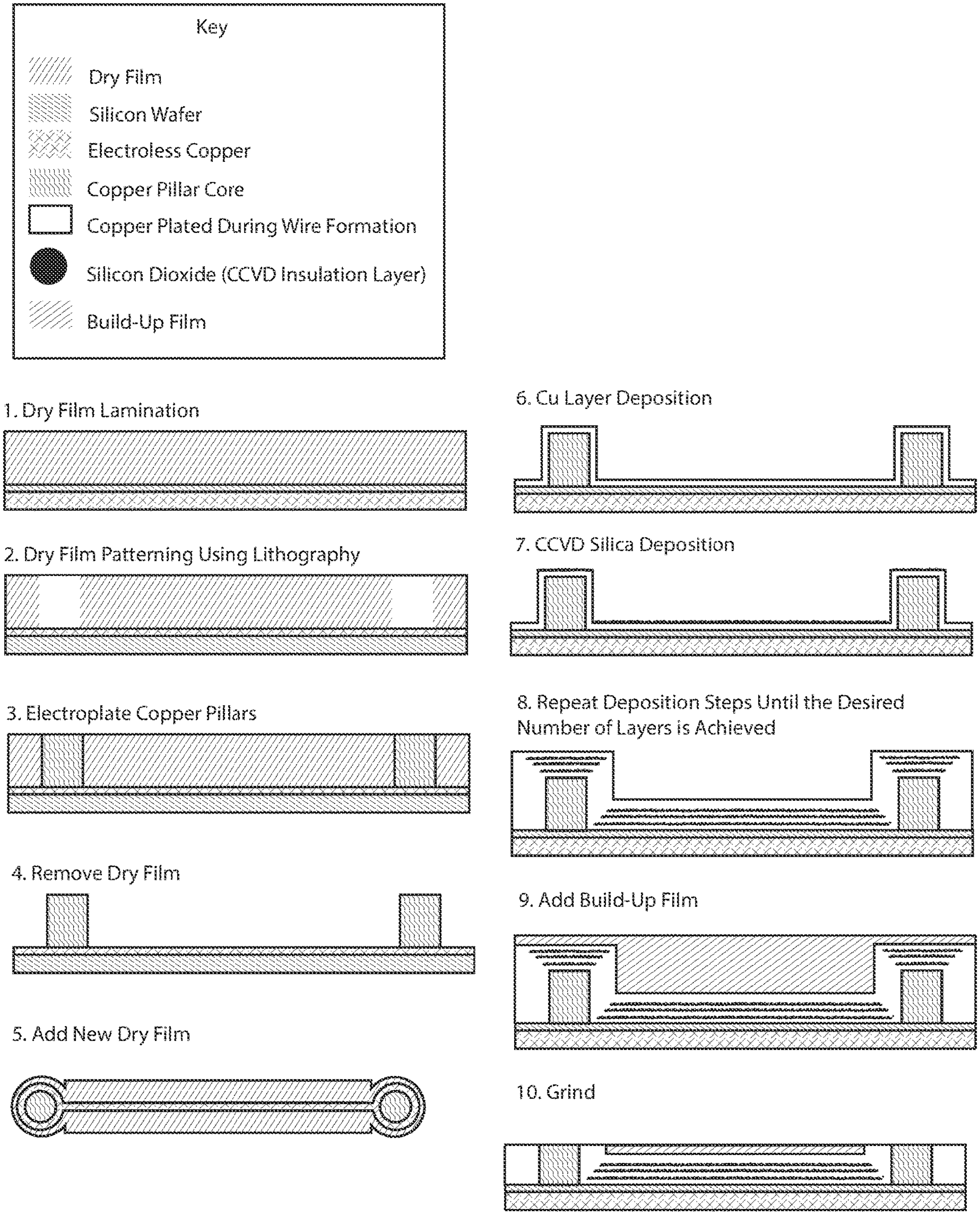
FIG. 37 is a flowchart of an exemplary method of the present invention for forming connectors with the hybrid material such that hybrid material is formed after the formation of the connectors.

An alternate method of forming the layered wire and the connectors is shown in FIG. 37, where the connectors are plated first. Therefore, the initial patterning is for two pillars which will serve as the ends of the layered wire. The pillars are plated according to the patterning, and the patterning is removed. A new pattern is added and shaped to fit the copper pillars and allow for wire to be formed between the pillars. The pattern may leave some space between itself and the copper pillars, as the copper pillars may receive copper deposited during the deposition of the wire. This spacing between the pattern and the pillars is shown in the top-down view of step 5 in FIG. 37. Although the copper shown in FIG. 40 has a different shading depending on when it was plated during the plating process, it is all copper, and thus, in its final form, it is equivalent to the embodiment shown in FIG. 36.

After the new pattern is placed, an initial conductive layer is plated. This new conductive layer will plate onto the exposed surfaces of the pillars and the seed layer: expanding the thickness and height of the pillars while also forming the first layer of the layered wire. After the initial conductive layer, a porous insulation layer is then deposited. When CCVD or AP-PECVD is used to form the insulation layer, the insulation will also fall onto the pillars. Because the insulation, in at least one embodiment, is coming from directly above, with regards to the pillars, it will mostly fall onto the tops of the copper pillars, and only a negligible amount will fall onto the sides of the copper pillars. (However, air current between the pillars generated by the heat of the CCVD process, and other environmental factors, may cause some insulation to form a snow-like drift at the base of the copper pillars at each porous insulation layer level.) Multiple conductive and insulative layer may be formed.

On the pillars, after repetition of the conductive and insulation deposition steps, there will be a conductive and insulative layer for every conductive and insulative layer plated to create the wire. This results in excess layering on the top of the pillars; the excess on the pillars will be removed by a grinding process, which involves removing the current pattern, adding build-up film, and then grinding everything down until the layers on the pillars are removed, and the desired height of the pillars is achieved. Still even though ground down, in most cases, the pillars will be much higher than the layered wire.

Figure 38:
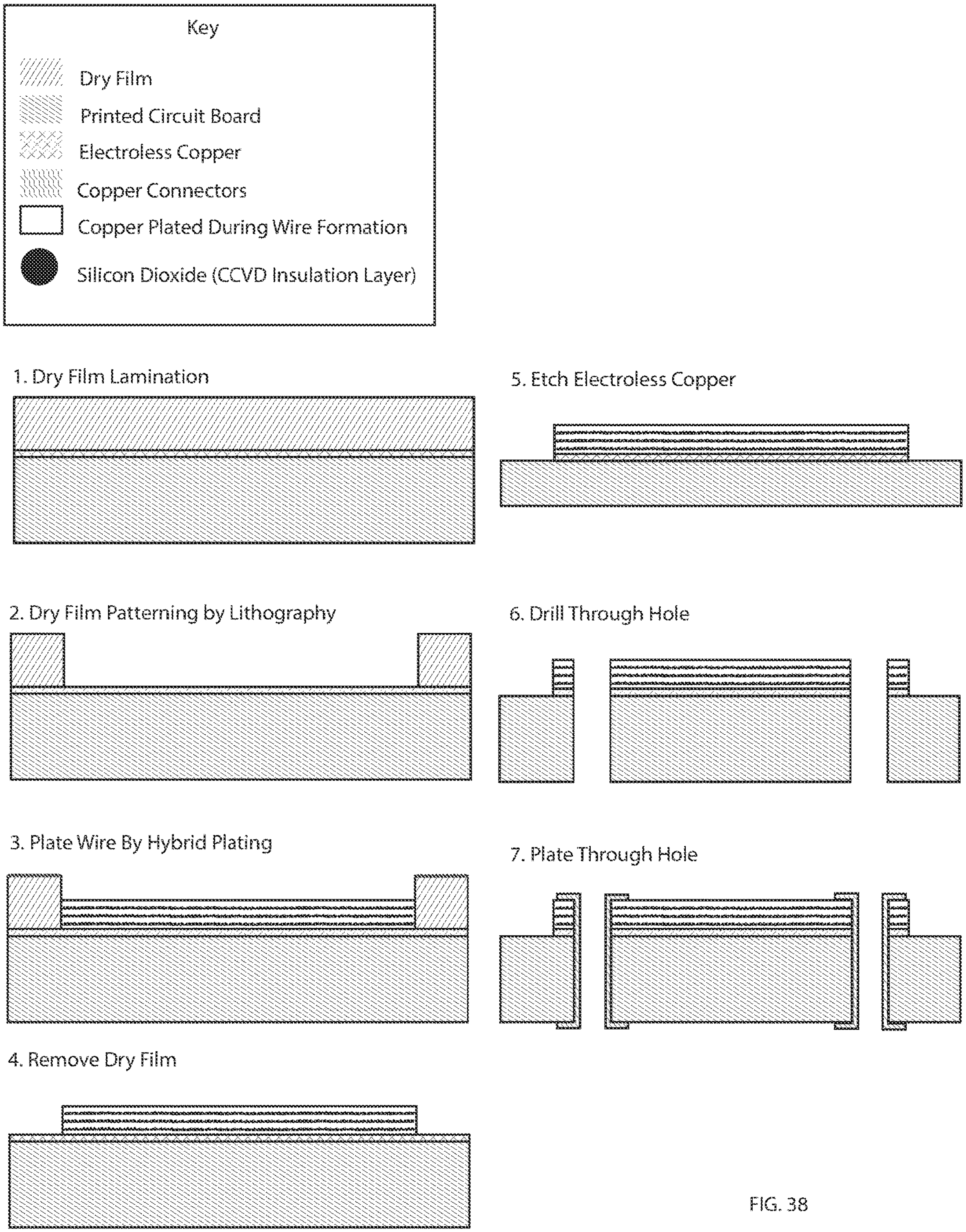
FIG. 38 is a flowchart of an exemplary method of the present invention for forming connectors with the hybrid material through a printed circuit board.

In at least one exemplary embodiment of the present invention, as shown in FIG. 38, the layered wire will be plated onto a PCB board and plated through holes that will serve as the connectors. Here the hybrid plating method is used to create the wire on the PCB board. The ends of the wire and the portion of the PCB board covered by the wire are drilled through. These drilled through holes are then plated with a conductor. The through-plated conductor may serve as the multi-layer connector because it starts above the wire and goes through the cross-section of the wire, and it also goes through the PCB. With PCB, a wire with connectors can be plated in multiple areas of the PCB board so that more than one wire may be created.

Figure 39A:
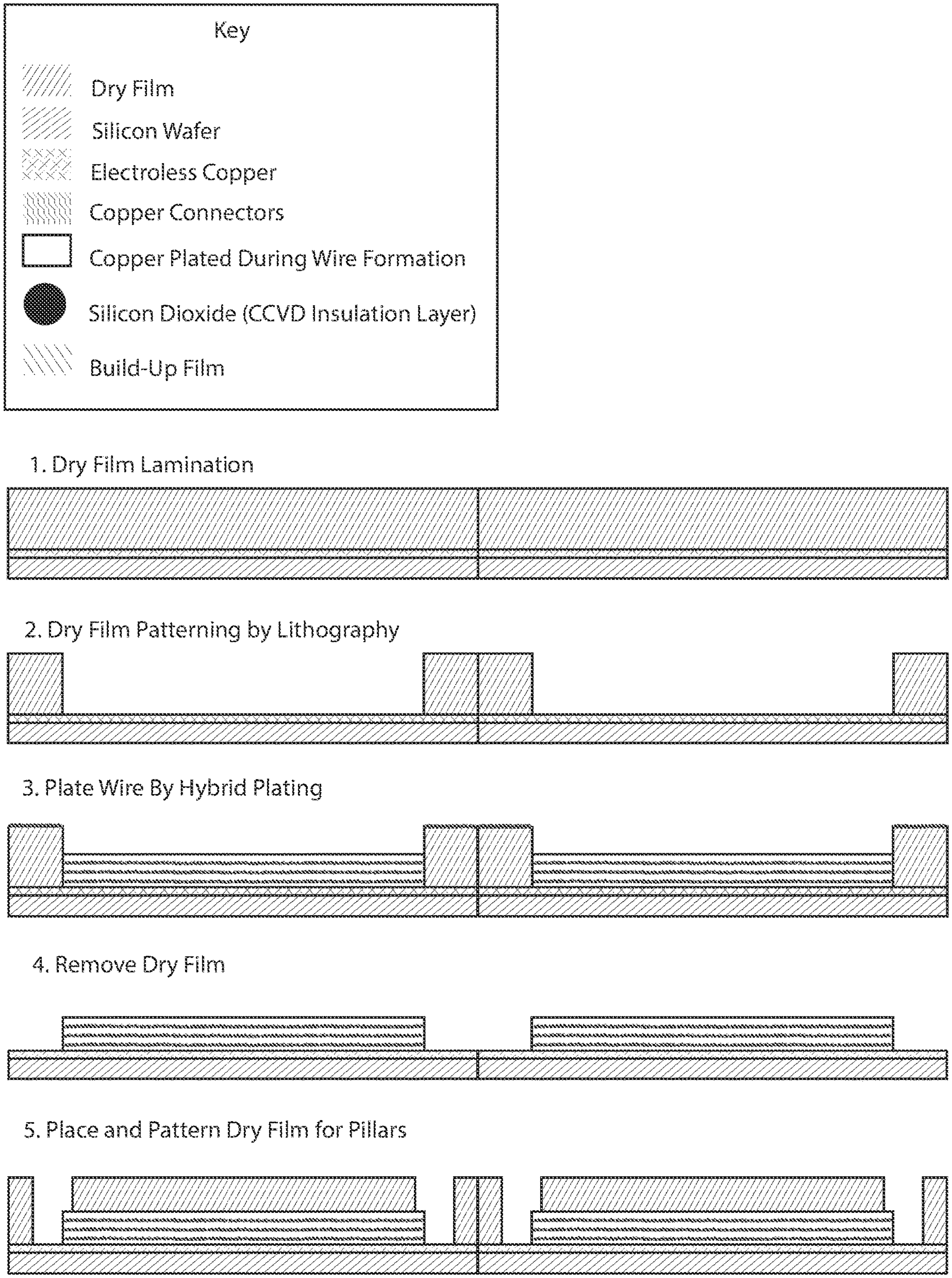
FIG. 39*a* and FIG. 39*b* are a two-page flowchart of the present invention showing the method for forming connectors with hybrid material where multiple hybrid wires and connectors are made on the same base.
Figure 39B:
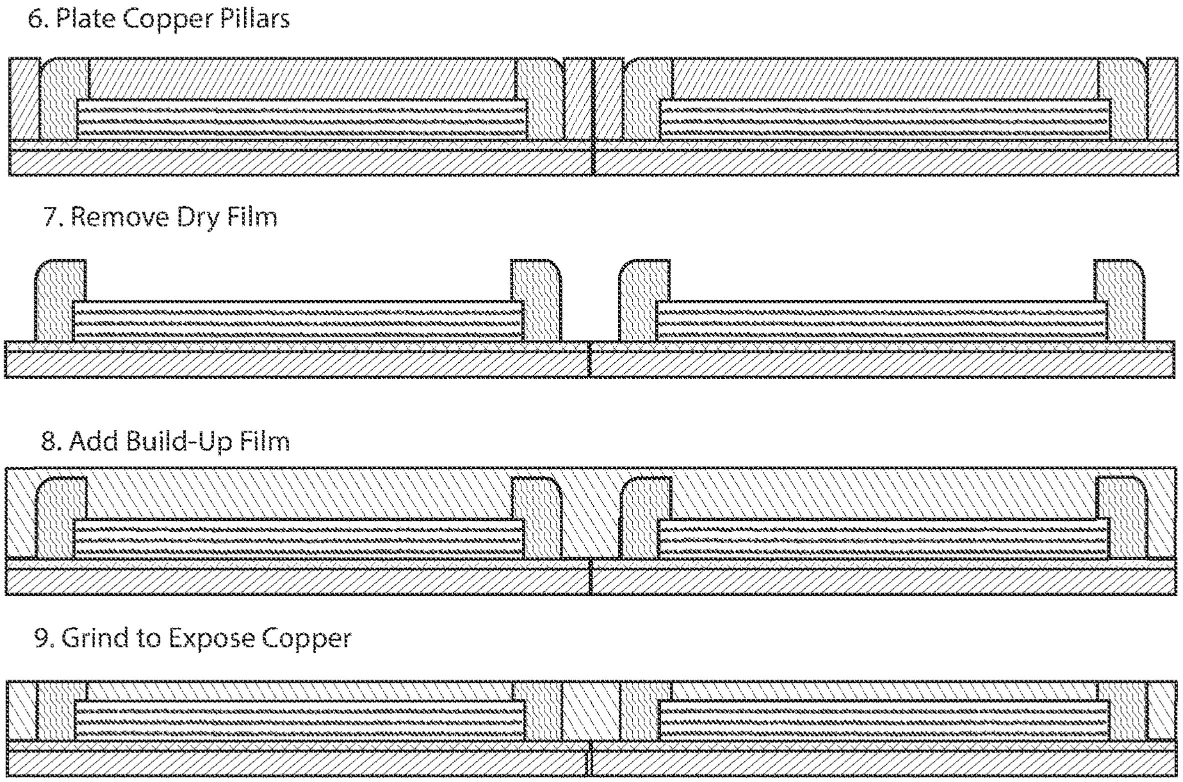

The methods of plating hybrid wires with connectors can be used to plate multiple hybrid wires and connectors at one time. In at least one embodiment, the wires are plated first, and this is shown in FIGS. 39*a* and 39*b* as a method to plate multiple wires and connectors simultaneously. This is achieved by plating multiple conductive materials onto the seed layer of a single silicon wafer or base. As shown in FIG. 30, specific styles of electroplating such as pigtail plating may be used.

Some applications for the conductive material of the present invention include the following examples. Still, the present invention is not limited to the following and may be used wherever copper is used, and it is especially suited for replacing copper conductors created by an electroplating process. The hybrid material may serve as the conductive material for radio frequency filters where it allows for smaller sizes and higher Q; it may be used in phase lock loops to improve the Q of the LC Tank; it may be used in High Frequency DC/DC Converter (Silicon, GaN or SiGe) to improve efficiency; it may be used in oscillators to improve Q; it may be used in microwave communication to produce smaller more sensitive modules; it may be used as or with antenna to improve sensitivity; and it may be used as transmission lines to improve the signal to noise ratios.

The drawings and figures show multiple embodiments and are intended to be descriptive of particular embodiments but not limited with regard to the scope, number, or style of the embodiments of the invention.

All figures are prototypes and rough drawings: the final products may be refined by one of ordinary skills in the art. Nothing should be construed as critical or essential unless explicitly described as such. Also, the articles “a” and “an” may be understood as “one or more.” Where only one item is intended, the term “one” or other similar language is used. The terms “has,” “have,” “having,” or the like are intended to be open-ended terms. When a range is included, a subsequent range utilizing any numbers within the original range is possible, exists as a concept, and is intended to be disclosed. When the specification defines a term differently than what is incorporated by reference, the specification controls in relation to the present invention. Porous insulation layers, including their voids, are not drawn to scale in the figures, but they are enlarged to enable them to be seen.

The invention claimed is:

1. A method of forming a hybrid conductive material, comprising: preparing a layer of conductive material; forming a porous insulative layer onto a surface of the layer of conductive material; depositing an additional layer of conductive material onto a surface of the insulative layer in a manner connecting the additional layer of conductive material to the prepared conductive material through the porous insulative layer;

performing and repeating at least once, the steps of depositing an additional layer of porous insulative layer onto a surface of the additional layer of conductive material and depositing at least one further layer of conductive material onto the additional layer of porous insulation.

2. The method of claim 1, wherein the conductive material has a primary composition incorporating gold, silver, copper, or an alloy thereof.

3. The method of claim 1, wherein the deposition of a subsequent conductive material layer immediately follows the insulative layer formation with no surface preparation of the insulative material.

4. The method of claim 1, wherein a CCVD process is used to form the porous insulative layer wherein the porous insulative layer is a porous silicon dioxide layer of less than 250 nm in thickness.

5. The method of claim 1, wherein an AP-PECVD process is used in the formation of the porous insulative material, wherein the resulting porous insulative layer has a total thickness of less than 4 μm.

6. The method of claim 1, wherein the layering process occurs on one or both sides of a semiconductor substrate, semiconductor wafer, metallic foil, or printed circuit board simultaneously or serially.

7. The method of claim 1 further comprising; patterning at least one connector on at least one edge of the hybrid material, depositing the connector according to the pattern, and leveling the connector.

8. The method of claim 1, wherein the formation of the porous insulative layer occurs by forming a nonporous insulative layer and processing the layer post deposition to introduce a regular or random pattern of voids in the nonporous insulative layer.

9. The method of claim 8, wherein the pattern of voids is produced by a thinning process of the nonporous insulative layer where the layer is thinned to such an extent as to introduce the necessary voids necessary to immediately begin electroplating.

10. The method of claim 1, further comprising performing and repeating the steps of depositing an additional layer of porous insulative layer onto a surface of the additional layer of conductive material and depositing at least one further layer of conductive material onto the additional layer of porous insulation until or before the earliest of 60 layers or 50 μm total conductive material thickness is reached.

11. The method of claim 1, further comprising washing and drying each of the conductive material layers before depositing the additional porous insulative layer onto the conductive material.

12. The method of claim 11, wherein at least one conductive layer has a composition which differs from at least one of the other conductive layers.

13. The method of claim 1, wherein the method of preparing each conductive material layer is an electroplating method.

14. The method of claim 13, wherein the electroplating method is a direct current plating, pulse plating, reverse pulse plating technique or a combination of these techniques.

15. The method of claim 1, wherein the porous insulative layer is deposited by combustion chemical vapor deposition and is between 10 nm and 250 nm thick.

16. The method of claim 15, wherein a chemical precursor used in the combustion chemical vapor deposition is a silicon dioxide precursor.

17. The method of claim 16, wherein the silicon dioxide precursor is in the class of chemicals comprising polysiloxane.

18. The method of claim 1, further comprising depositing the hybrid material as a wire.

19. The method of claim 18, wherein a wire pattern is used when depositing the hybrid material, and is not replaced or removed during the deposition process and wherein the insulation deposition occurs in part on a top surface of the wire pattern used in the deposition of the hybrid material for up to 60 electroplated conductive layers.

20. The method of claim 18, wherein a wire pattern is used to shape a wire when depositing the hybrid material, and the wire pattern is passed through a deposition flame or a plasma at a rate exceeding 1 meter per minute.

21. The method of claim 18 wherein a wire pattern is used when depositing the hybrid material, and the wire pattern is passed through a deposition flame or plasma at a distance closer than 20 cm from the source.

* * * * *